United States Patent
Park et al.

(10) Patent No.: US 9,380,453 B2
(45) Date of Patent: Jun. 28, 2016

(54) MOBILE TERMINAL AND METHOD OF CONTROLLING THE SAME

(71) Applicant: LG ELECTRONICS INC., Seoul (KR)

(72) Inventors: Jongseok Park, Seoul (KR); Jumin Chi, Seoul (KR); Jinhae Choi, Seoul (KR); Sohoon Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/285,452

(22) Filed: May 22, 2014

(65) Prior Publication Data

US 2014/0370937 A1    Dec. 18, 2014

Related U.S. Application Data

(60) Provisional application No. 61/832,971, filed on Jun. 10, 2013.

(30) Foreign Application Priority Data

Jun. 13, 2013  (KR) .......................... 10-2013-0067542
Jul. 31, 2013  (KR) .......................... 10-2013-0091059

(51) Int. Cl.
*H04M 1/00* (2006.01)
*H04W 8/22* (2009.01)
(Continued)

(52) U.S. Cl.
CPC .............. *H04W 8/22* (2013.01); *G06F 1/1626* (2013.01); *G06F 1/1684* (2013.01);
(Continued)

(58) Field of Classification Search
CPC ............. H04B 13/005; H04M 1/7253; H04M 1/72519; H04M 1/72522; H04M 1/0214; H04M 1/3833; H04M 1/0216; H04M 1/0245; H04W 76/023; H04W 12/08; H04W 4/003; H04W 88/02
USPC ...................... 455/550.1, 90.1, 90.3; 345/173
See application file for complete search history.

(56) References Cited

U.S. PATENT DOCUMENTS

2005/0246652 A1    11/2005  Morris .......................... 715/773
2007/0247434 A1    10/2007  Cradick et al.
(Continued)

FOREIGN PATENT DOCUMENTS

CN         103003770        3/2013
WO     WO 03/090008 A2     10/2003

OTHER PUBLICATIONS

European Search Report issued in Application No. 14001995.1 dated Jan. 20, 2015.
European Search Report issued in Application No. 14001995.1 dated Oct. 13, 2014.

*Primary Examiner* — Nhan Le
(74) *Attorney, Agent, or Firm* — Ked & Associates, LLP

(57) ABSTRACT

Provided is a mobile terminal and a method of controlling the same. The mobile terminal includes a body and a display provided on a front side of the body. An input device is provided on a back side of the body. The input device may be exposed through a back surface of the body and may have a plurality of buttons. A storage device may be provided to store a mapping between a prescribed pattern of inputs associated with the input device and prescribed commands for a plurality of functions. A controller may detect an input at the input device, determine a prescribed pattern associated with the input at the input device, retrieve from the storage device a command for a function associated with the prescribed pattern of the input, and process the retrieved command for the function associated with the input.

17 Claims, 35 Drawing Sheets

(51) Int. Cl.
*G06F 1/16* (2006.01)
*G06F 3/01* (2006.01)
*H04M 1/725* (2006.01)
*G06F 3/0489* (2013.01)
*G06F 3/0488* (2013.01)

(52) U.S. Cl.
CPC .............. *G06F 1/1694* (2013.01); *G06F 3/017* (2013.01); *G06F 3/0489* (2013.01); *G06F 3/04886* (2013.01); *H04M 1/72519* (2013.01); *G06F 2203/04101* (2013.01)

(56) References Cited

U.S. PATENT DOCUMENTS

| | | | |
|---|---|---|---|
| 2007/0268261 A1* | 11/2007 | Lipson | G06F 1/1616 345/169 |
| 2010/0134418 A1* | 6/2010 | Muresianu | G06F 1/1626 345/169 |
| 2013/0069883 A1 | 3/2013 | Oga | 345/172 |

* cited by examiner

FIG. 8

| Examples | | | |
|---|---|---|---|
| Backside input unit(232) | 1st button part(233) | ○ | Button not pushed |
| | 2nd button parts (234a,234b) | ▨ | Button pushed |

| Item | Push combination of backside input unit | Function provided |
|---|---|---|
| 1 | ▨ or ☐ or ☐ | Release power saving mode (Set display locked) |
| 2 | ▨ ⇒ ☐ ⇒ ☐ | Activate camera application |
| 3 | ▨ ⇒ ▨ ⇒ ▨ | Activate quick memo application |
| 4 | ▨ ⇒ ☐ ⇒ ☐ ⇒ ▨ ⇒ ▨ | Release power saving mode (Release display lock) |
| 5 | ▨ or ☐ ←Pushing the button for prescribed duration | Activate camera application |

FIG. 9
| Item | Combination of backside input unit and gesture | Function provided |
|---|---|---|
| 1 | 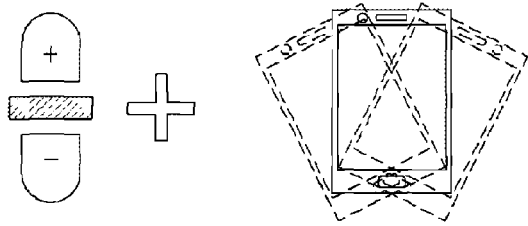 | Activate 1st application |
| 2 | 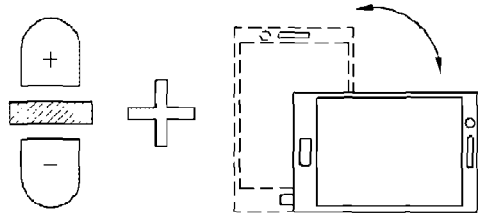 | Activate 2nd application |
| 3 | 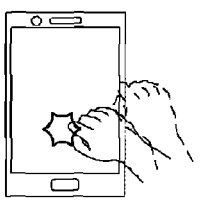 | Activate 3rd application |

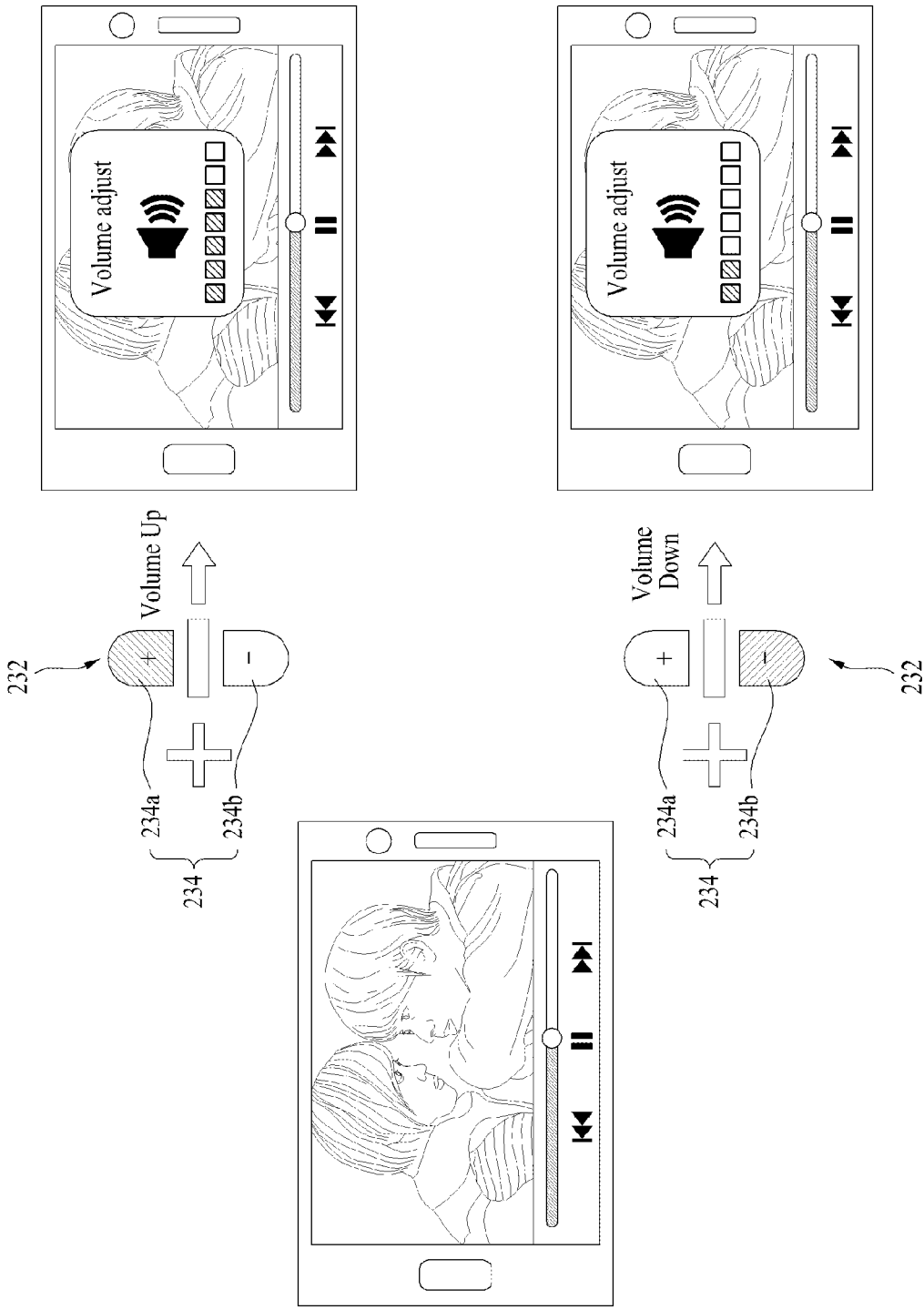

FIG. 10B
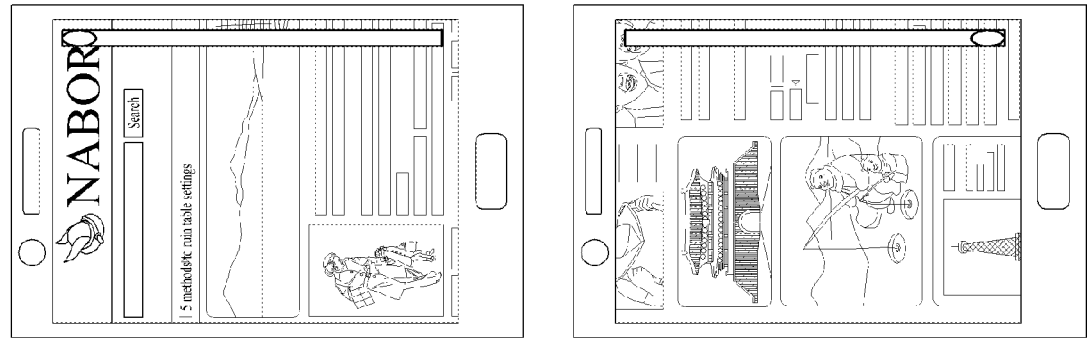
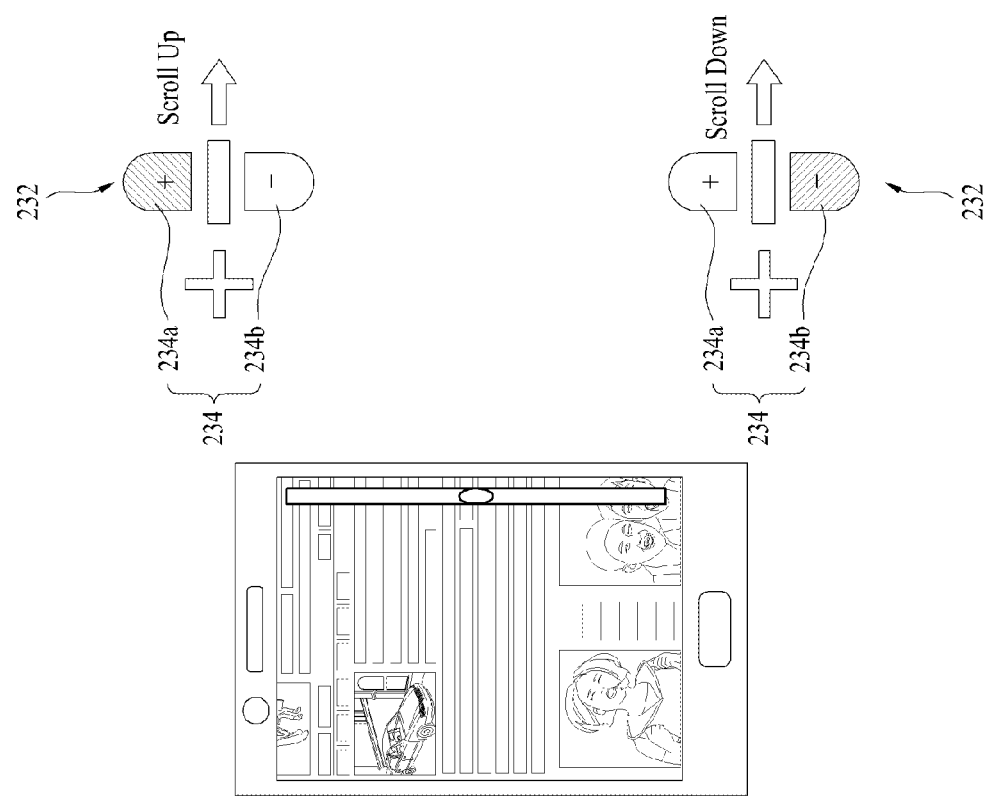

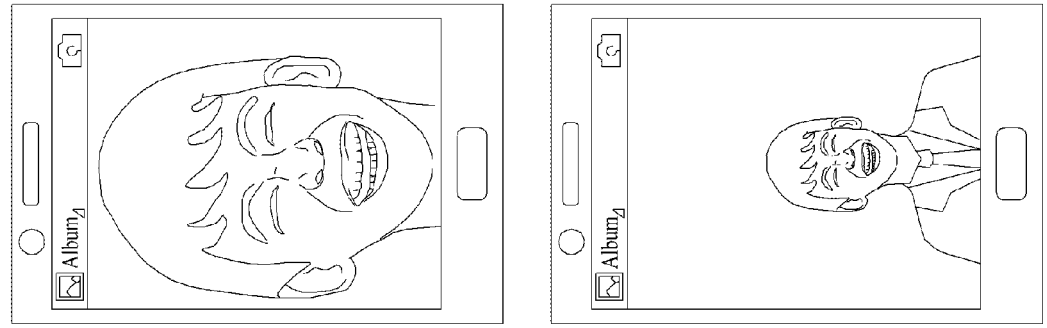
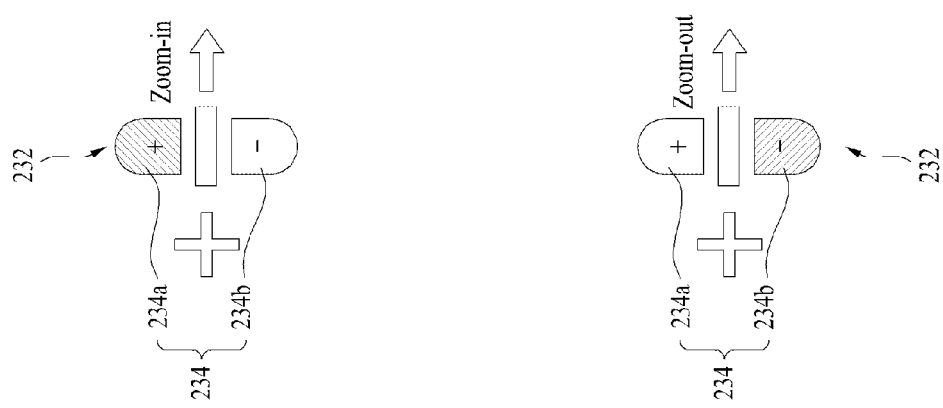
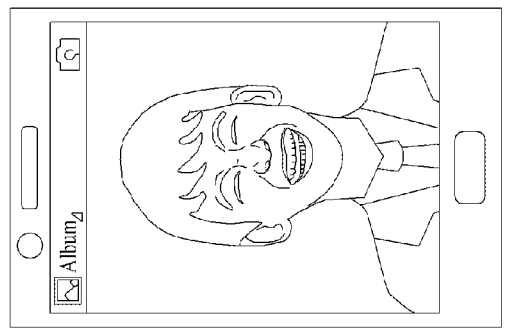
FIG. 10C

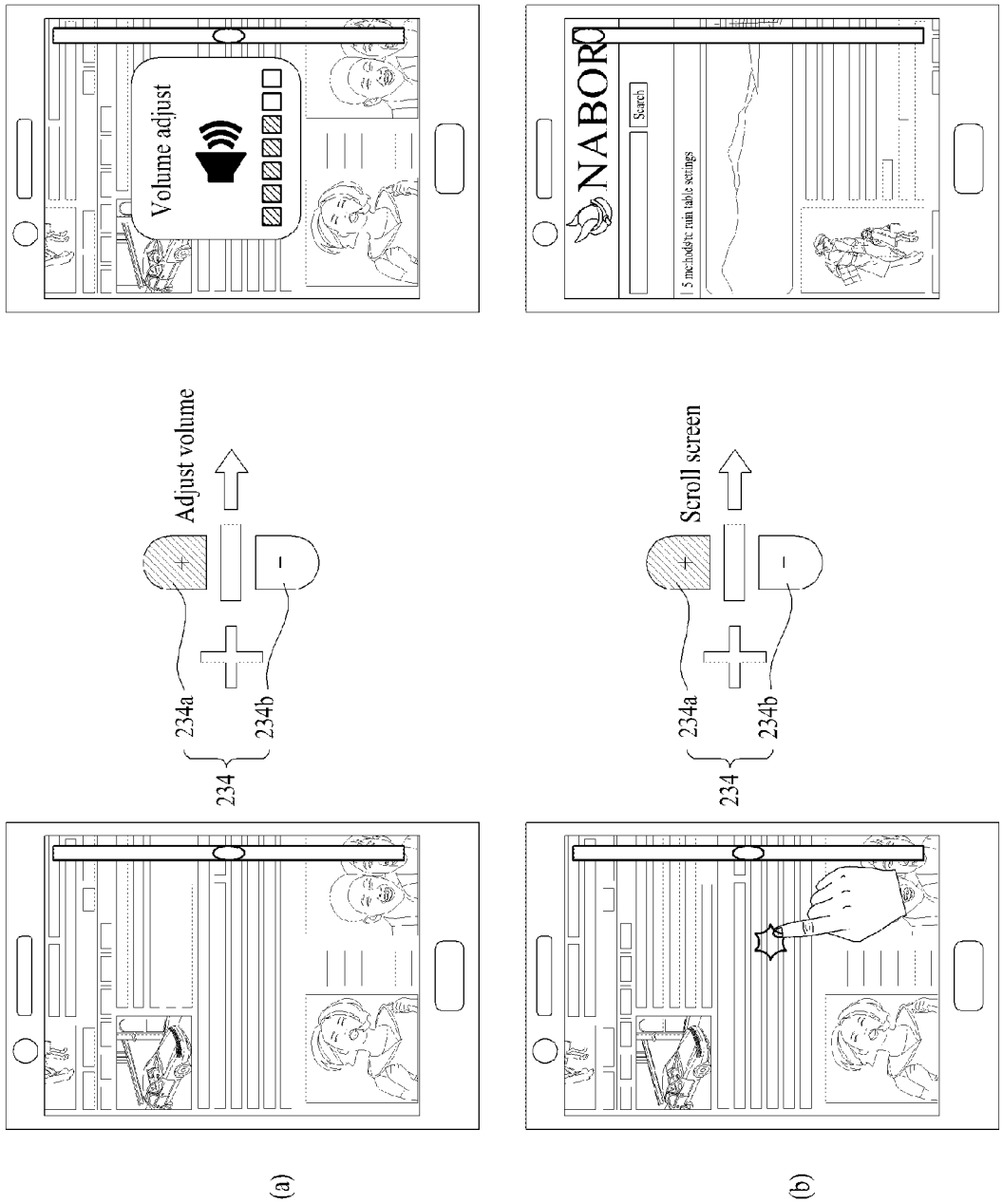

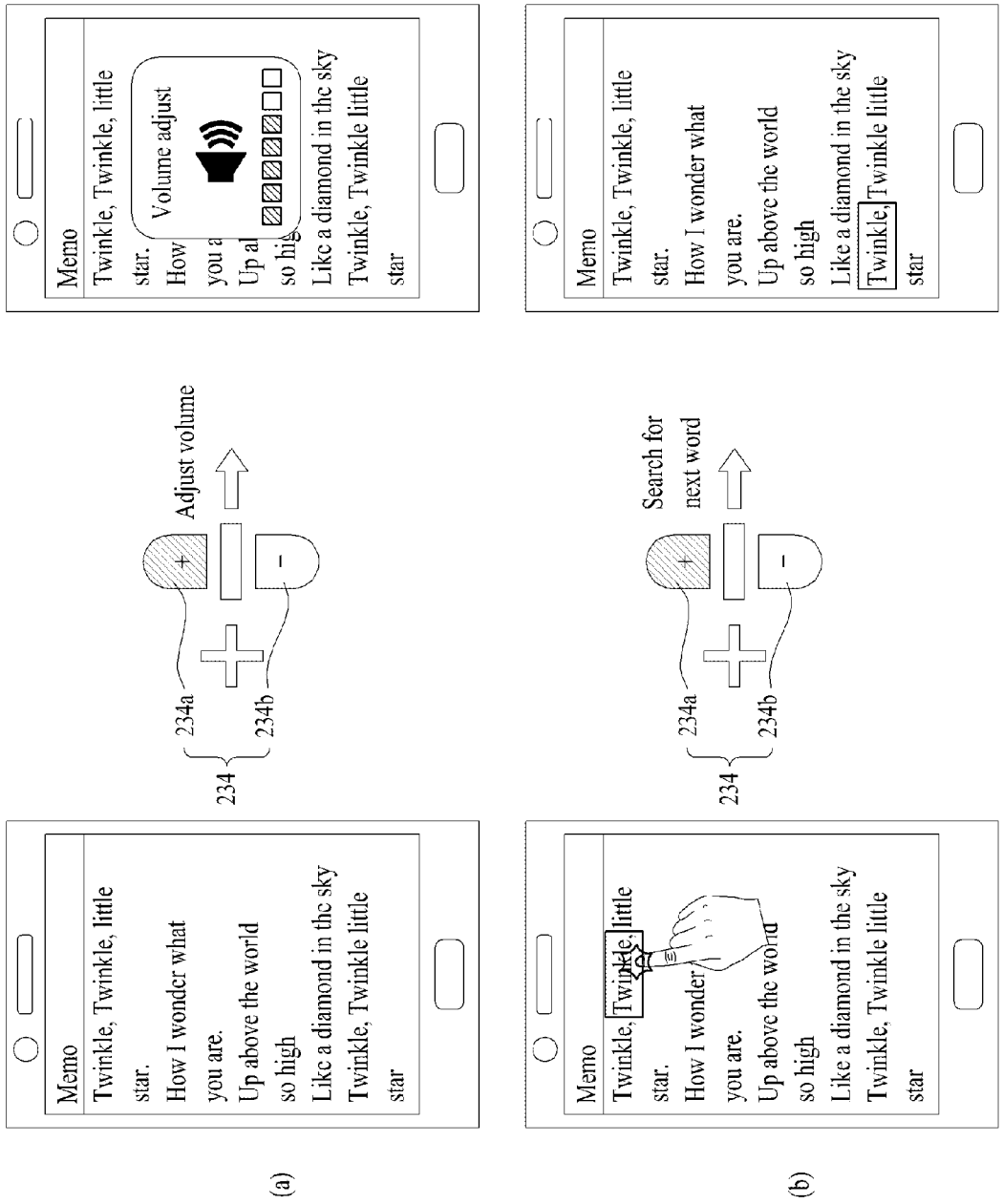

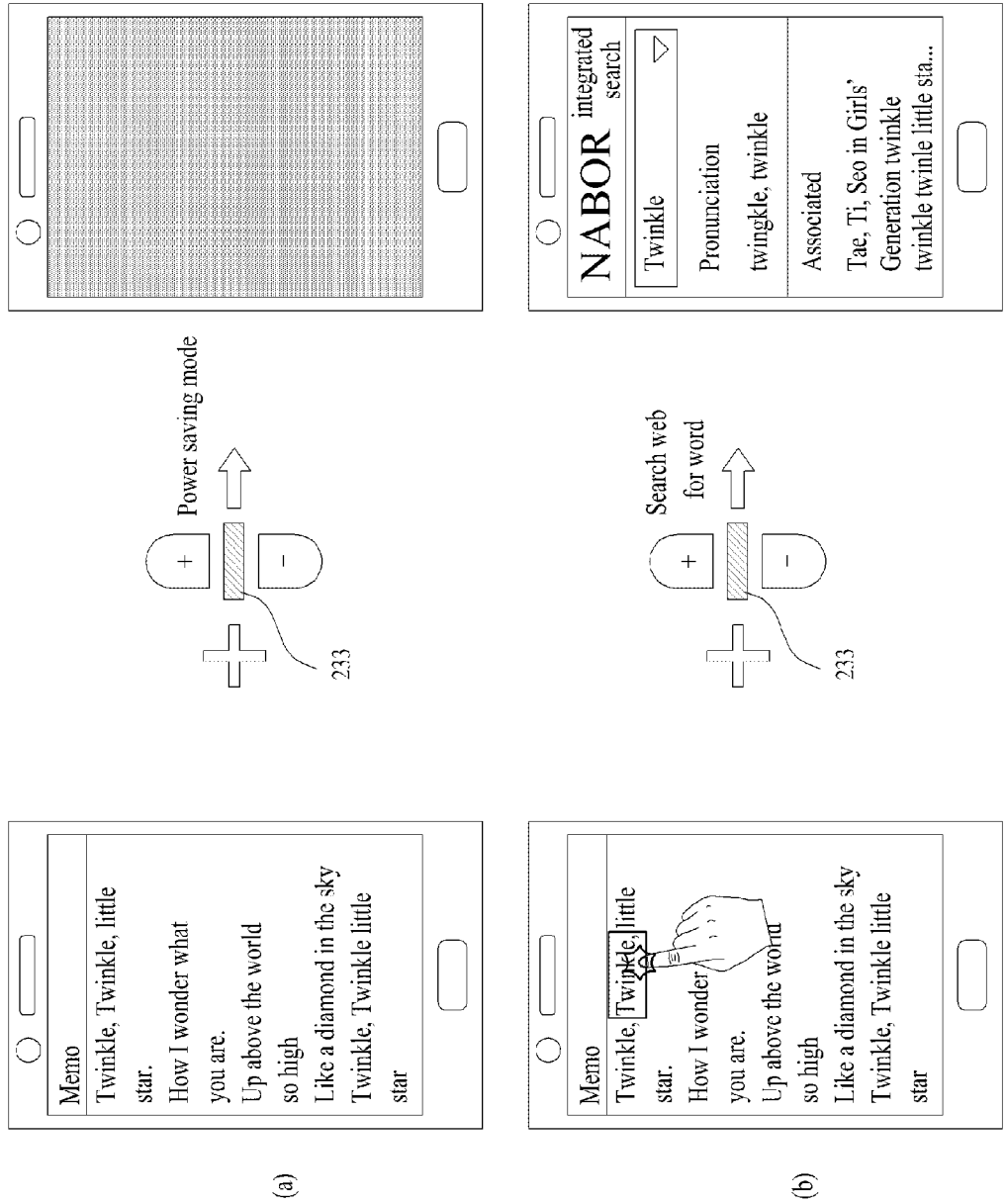

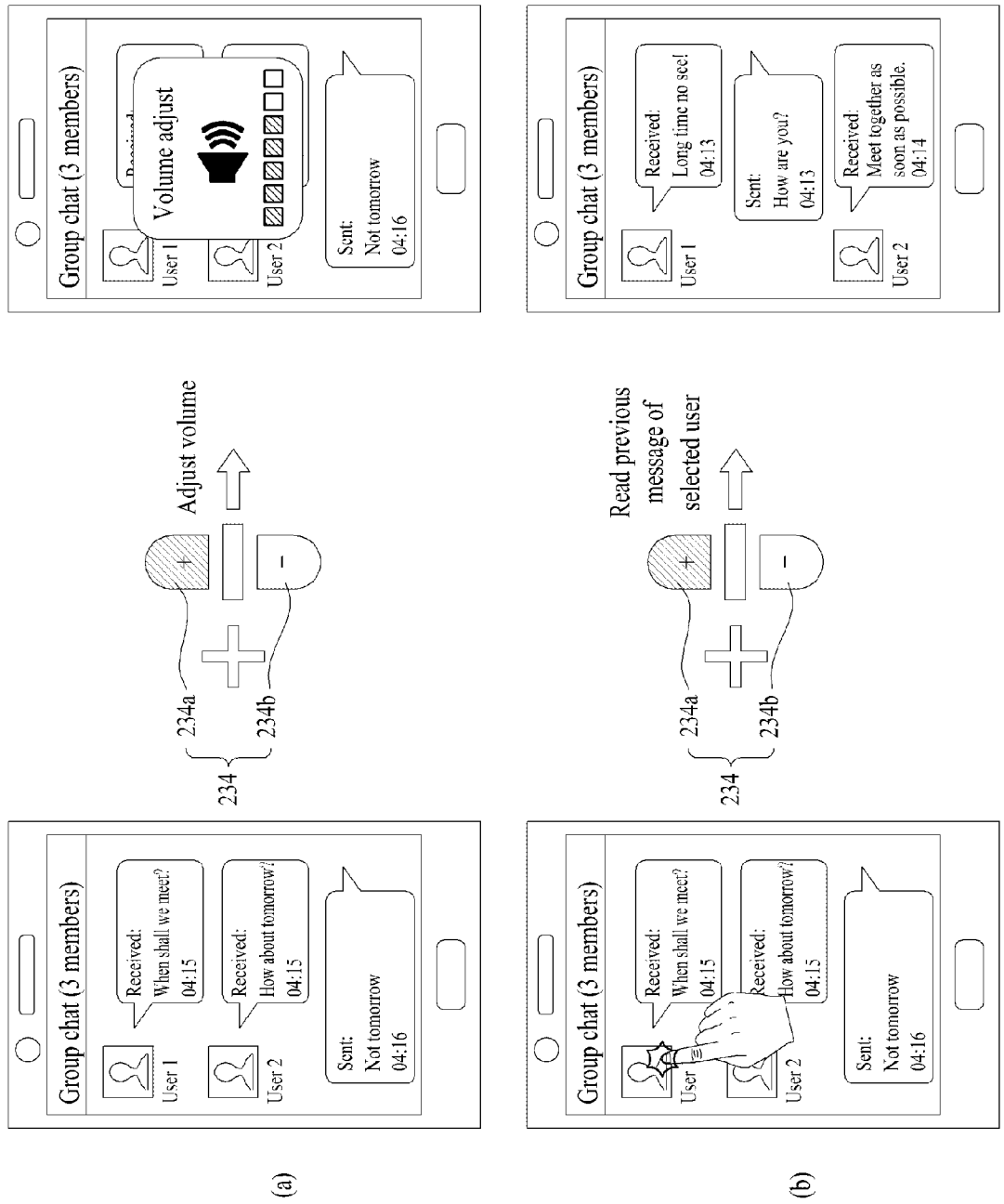

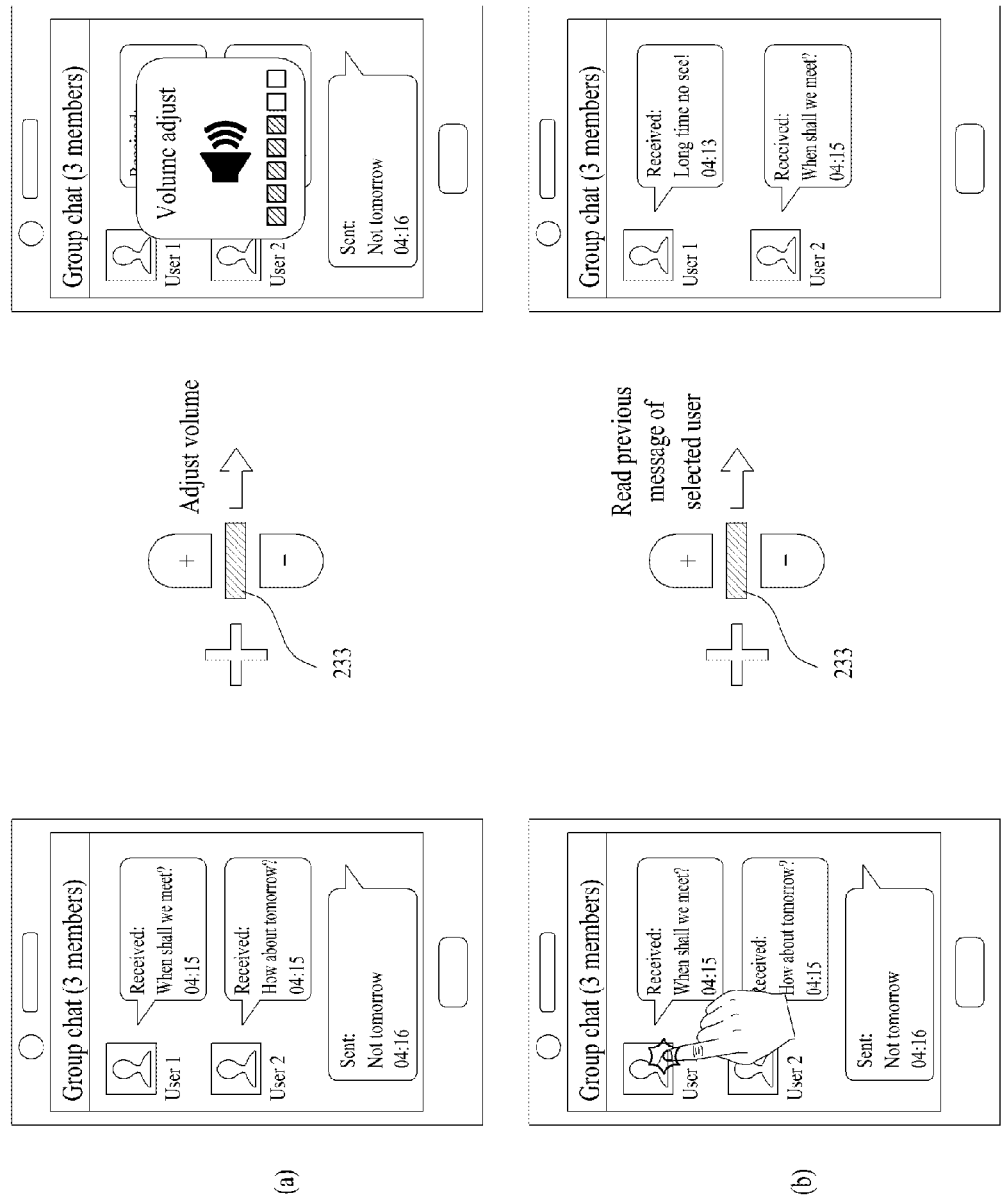

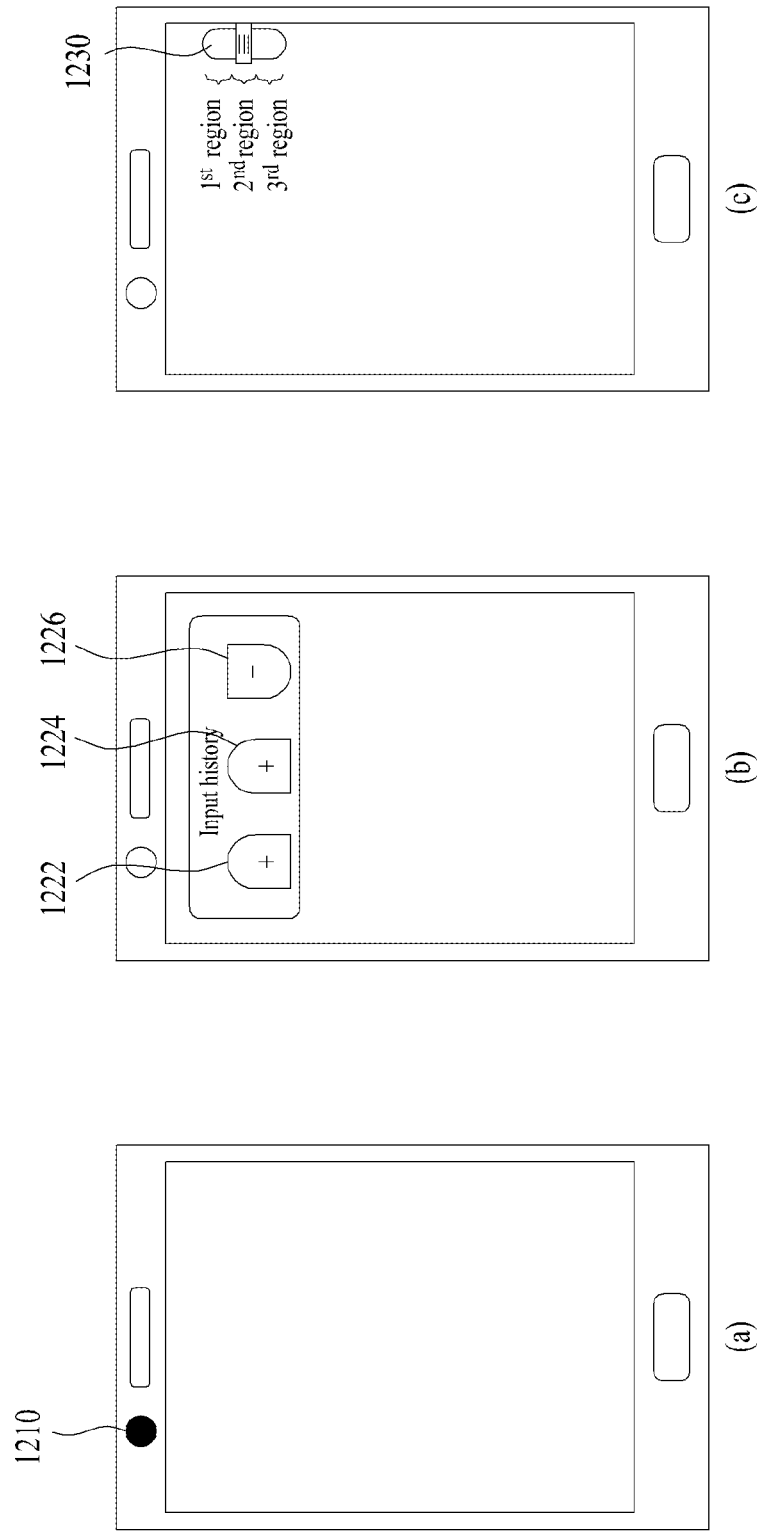

Captured image

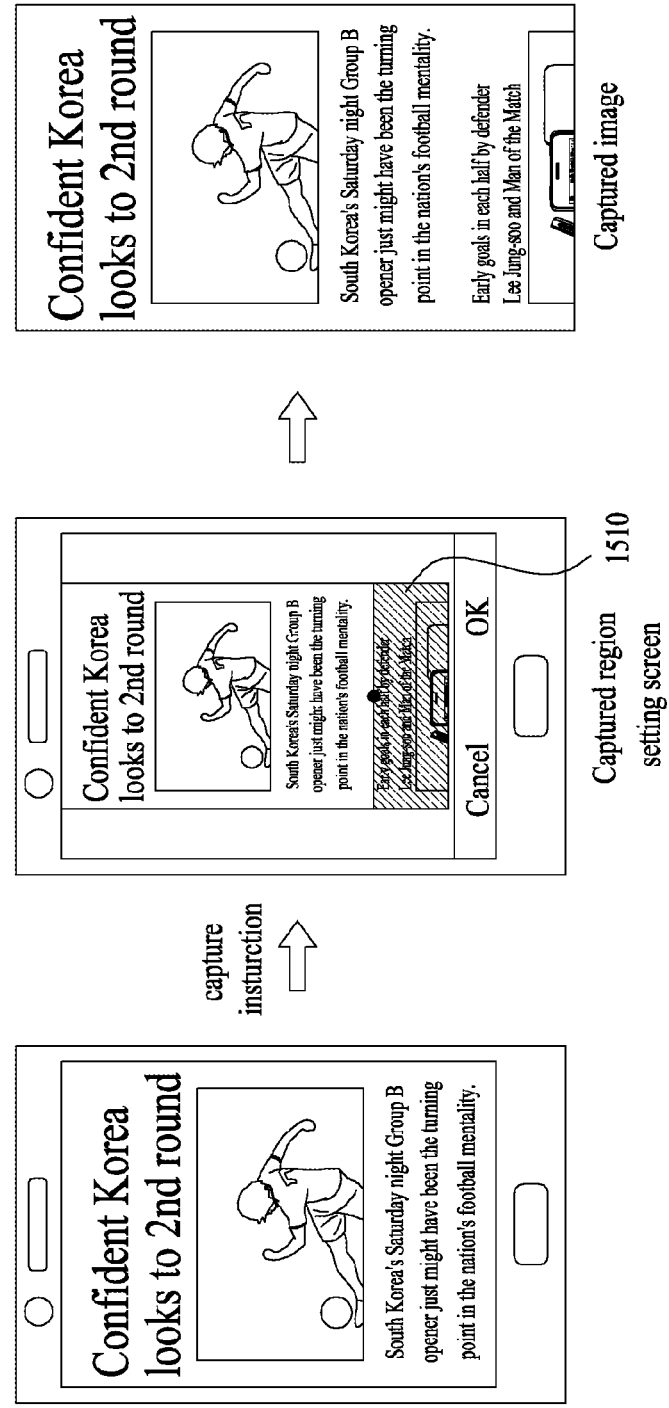

FIG. 20

| Key manipulation | | Action | App entry or Function provided |
|---|---|---|---|
| | Right button | Long press | Activate designated App (e.g., activate recent app, Cursor movement and selection available in recent app) |
| | Left button | Long press | Activate designated App (e.g., activate Q voice) |
| | Top/Bottom/ Left/Right | Push one by one | Remote controller: Channel/Volume control available Map: Left/Right move, Top/Bottom Zoom in/out |
| | Left/Right | Push one by one | Homesreen: Page shift Message/Email: Left/Right button for shift to previous/next message (or mail) Chatting App: Switch several chat windows using Left/Right button |
| | Top/Bottom/ Left/Right | Push by preset pattern and then push OK button | Enter designated App or Enter another user mode of mobile phone (Guest mode/Multi-user) |
| | Top/Bottom/ Left/Right | Push by preset pattern and then push OK button | Unlock screen locked with password |

MOBILE TERMINAL AND METHOD OF CONTROLLING THE SAME

CROSS-REFERENCE TO RELATED APPLICATION(S)

Pursuant to 35 U.S.C. §119(e) and §119(a), this application claims the benefit of earlier filing date and right of priority to U.S. Provisional Application No. 61/832,971 filed on Jun. 10, 2013; Korean Application No. 10-2013-0067542, filed on Jun. 13, 2013 and Korean Application No. 10-2013-0091059, filed on Jul. 31, 2013, the contents of all of which are hereby incorporated by reference herein in their entireties.

BACKGROUND

1. Field

The present disclosure relates to a mobile terminal, and more particularly, to a mobile terminal and a method of controlling the same. Although the present disclosure is suitable for a wide scope of applications, it is particularly suitable for providing an input unit to a rear part of the mobile terminal.

2. Background

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

In order to implement the complicated functions of the multimedia device, various kinds of new attempts are applied in aspect of hardware and/or software. For instance, a user interface environment for enabling a user to search or select functions conveniently and easily is currently provided.

On the other hand, as a mobile terminal is regarded as a personal belonging for representing user's personality, the demands for various design shapes of mobile terminals are rising. The design shape includes structural modification and improvement for enabling a user to use a mobile terminal more conveniently. As one of the structural modifications and improvements, a manipulating unit can be considered.

However, a manipulating unit provided separately from a touchscreen may degrade slim shape and simple design of a terminal. And, the manipulating unit causes a problem that a display region is decreased by the manipulating unit provided to a lateral side of the terminal. Therefore, in order to solve the above-mentioned problems, an inputting method using a new structure can be taken into consideration.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements, wherein:

FIG. 8 is a diagram of a mapping relation between an input combination for a backside input unit and a function or application indicated by the input combination;

FIG. 9 is a diagram for an application to be activated per gesture type if a gesture is additionally inputted in the course of pushing a backside input unit;

FIGS. 10A to 10C are diagrams for one example to describe a function performed by a push input to a backside input unit for each data type outputted via a display unit;

FIGS. 11A to 11F are diagrams for one example to describe that a different command is processed based on whether a display unit is touched when a backside input unit is pushed;

FIG. 12 is a diagram foe one example of a feedback outputted when a backside input unit is pushed;

FIGS. 15A and 15B are diagrams for one example to describe a capture function;

FIG. 20 is a diagram for a mapping relation between an input combination to a backside input unit having 5 keys and a function or application indicated by the input combination.

DETAILED DESCRIPTION

In the following detailed description, reference is made to the accompanying drawing figures which form a part hereof, and which show by way of illustration specific embodiments of the disclosure. It is to be understood by those of ordinary skill in this technological field that other embodiments may be utilized, and structural, electrical, as well as procedural changes may be made without departing from the scope of the present disclosure. Wherever possible, the same reference numbers will be used throughout the drawings to refer to the same or similar parts.

As used herein, the suffixes 'module,' 'unit' and 'part' are used for elements in order to facilitate the disclosure only. Therefore, significant meanings or roles are not given to the suffixes themselves and it is understood that the 'module,', 'unit' and 'part' can be used together or interchangeably.

The present disclosure can be applicable to a various types of mobile terminals. Examples of such terminals include mobile phones, user equipment, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
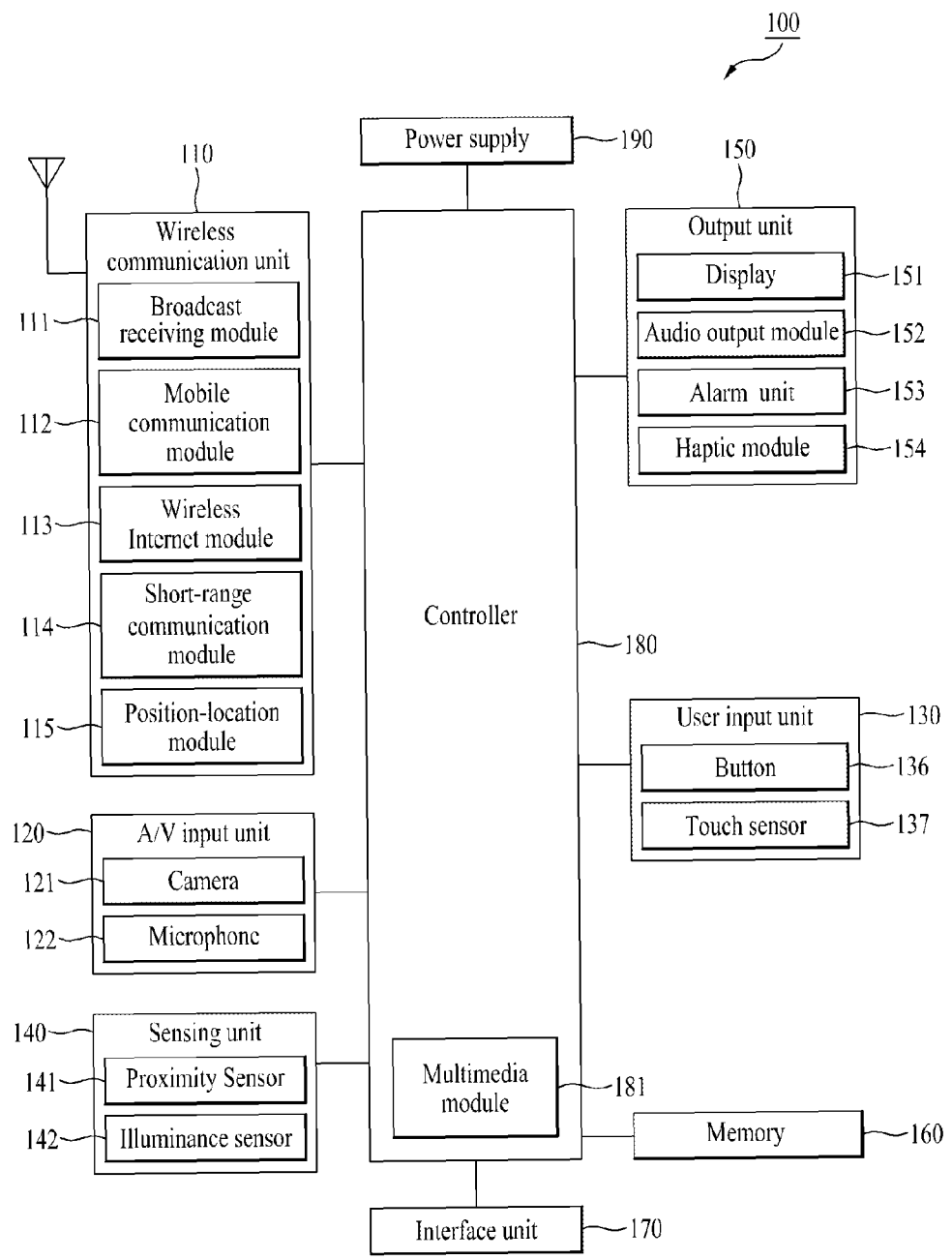
FIG. 1 is a block diagram of a mobile terminal according to one embodiment of the present disclosure.

FIG. 1 is a block diagram of a mobile terminal 100 according to an embodiment of the present disclosure. FIG. 1 shows the mobile terminal 100 according to one embodiment of the present disclosure which may include a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer number of components may alternatively be implemented.

In the following description, the above elements of the mobile terminal 100 are explained in sequence.

First of all, the wireless communication unit 110 may typically include one or more components which permits wireless communication between the mobile terminal 100 and a wireless communication system or network within which the mobile terminal 100 is located. For instance, the wireless communication unit 110 may include a broadcast receiving module 111, a mobile communication module 112, a wireless internet module 113, a short-range communication module 114, a position-location module 115 and the like.

The broadcast receiving module 111 may receive a broadcast signal and/or broadcast associated information from an external broadcast managing server via a broadcast channel. The broadcast channel may include a satellite channel and a terrestrial channel. At least two broadcast receiving modules 111 may be provided to the mobile terminal 100 in pursuit of simultaneous reception of at least two broadcast channels or to facilitate switching between broadcast channels.

The broadcast managing server may be a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, a data broadcast signal, or any other appropriate type of broadcast signal. If desired, the broadcast signal may further include a broadcast signal combined with a TV or radio broadcast signal.

The broadcast associated information may include information associated with a broadcast channel, a broadcast program, a broadcast service provider, or the like. Moreover, the broadcast associated information may be provided via a mobile communication network. In this case, the broadcast associated information may be received by the mobile communication module 112.

The broadcast associated information may be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. Such broadcasting systems may include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®), integrated services digital broadcast-terrestrial (ISDB-T), or the like. Optionally, the broadcast receiving module 111 may be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 may transmit/receive wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 may support Internet access for the mobile terminal 100. This module may be internally or externally coupled to the mobile terminal 100. In this case, the wireless Internet technology may include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution), etc.

Wireless internet access by Wibro, HSPDA, GSM, CDMA, WCDMA, LTE or the like may be achieved via a mobile communication network. In this aspect, the wireless internet module 113 configured to perform the wireless internet access via the mobile communication network can be understood as a sort of the mobile communication module 112.

The short-range communication module 114 may facilitate relatively short-range communications. Suitable technologies for implementing this module may include radio frequency identification (RFID), infrared data association (IrDA), ultra-wideband (UWB), as well at the networking technologies commonly referred to as Bluetooth and ZigBee, to name a few.

The position-location module 115 may identify or otherwise obtain the location of the mobile terminal 100. If desired, this module may be implemented with a global positioning system (GPS) module. According to the current technology, the GPS module 115 may be able to precisely calculate current 3-dimensional position information based on at least one of longitude, latitude and altitude and direction (or orientation) by calculating distance information and precise time information from at least three satellites and then applying triangulation to the calculated information. Currently, location and time information is calculated using three satellites, and errors of the calculated location position and time information are then amended using another satellite. Moreover, the GPS module 115 may be able to calculate speed information by continuously calculating a real-time current location.

Referring to FIG. 1, the audio/video (A/V) input unit 120 may be configured to provide audio or video signal input to the mobile terminal 100. As shown, the A/V input unit 120 may include a camera 121 and a microphone 122. The camera 121 may receive and process image frames of still pictures or video, which are obtained by an image sensor in a video call mode or a photographing mode. And, the processed image frames may be displayed on the display 151.

The image frames processed by the camera 121 may be stored in the memory 160 or may be externally transmitted via the wireless communication unit 110. Optionally, at least two cameras 121 may be provided to the mobile terminal 100 according to environment of usage.

The microphone 122 may receive an external audio signal while the portable device is in a particular mode, such as phone call mode, recording mode, voice recognition mode, or the like. This audio signal may be processed and converted into electric audio data. The processed audio data may be transformed into a format transmittable to a mobile communication base station via the mobile communication module 112 in case of a call mode. The microphone 122 may typically include assorted noise removing algorithms to remove noise generated in the course of receiving the external audio signal.

The user input unit 130 may generate input data responsive to user manipulation of an associated input device or devices. Examples of such devices may include a button 136 provided to front/rear/lateral side of the mobile terminal 100 and a touch sensor (constant pressure/electrostatic) 137 and may further include a key pad, a dome switch, a jog wheel, a jog switch and the like.

The sensing unit 140 may provide sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. Such sensing unit 140 may include, gyro sensor, accelerate sensor, geomagnetic sensor, or the like.

As an example, consider the mobile terminal 100 being configured as a slide-type mobile terminal. In this configuration, the sensing unit 140 may sense whether a sliding portion of the mobile terminal is open or closed. Other examples may include the sensing unit 140 sensing the presence or absence of power provided by the power supply 190, the presence or absence of a coupling or other connection between the interface unit 170 and an external device. The sensing unit 140 may also include a proximity sensor 141.

The output unit 150 may generate output relevant to the senses of sight, hearing, touch and the like. And, the output unit 150 may include the display 151, an audio output module 152, an alarm unit 153, a haptic module 154 and the like.

The display 151 may typically be implemented to visually display (output) information associated with the mobile terminal 100. For instance, if the mobile terminal is operating in a phone call mode, the display may generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays may be implemented in a transparent or optical transmittive type, which may be referred to as transparent display. As a representative example of a transparent display, there is TOLED (transparent OLED) or the like. A rear configuration of the display 151 may be implemented in the optical transmittive type as well. In this configuration, a user may be able to see an object in the rear of a terminal body via the area occupied by the display 151 of the terminal body.

At least two displays 151 may be provided to the mobile terminal 100 in accordance with the implemented configuration of the mobile terminal 100. For instance, a plurality of displays may be arranged on a single face of the mobile terminal 100 in a manner of being spaced apart from each other or being built in one body. Alternatively, a plurality of displays may be arranged on different faces of the mobile terminal 100.

In case that the display 151 and the touch sensor 137 may configure a mutual layer structure (referred to herein as 'touchscreen'), it may be able to use the display 151 as an input device as well as an output device. In this case, the touch sensor may be configured as a touch film, a touch sheet, a touchpad or the like.

The touch sensor 137 may be configured to convert pressure applied to a specific portion of the display 151 or a variation of a capacitance generated from a specific portion of the display 151 to an electric input signal. Moreover, it may be able to configure the touch sensor 137 to detect a pressure of a touch as well as a touched position or size.

If a touch input is made to the touch sensor 137, signal(s) corresponding to the touch may be transferred to a touch controller. The touch controller may process the signal(s) and then transfer the processed signal(s) to the controller 180. Therefore, the controller 180 may be able to determine whether a prescribed portion of the display 151 is touched.

A proximity sensor 141 may be provided to an internal area of the mobile terminal 100 enclosed by the touchscreen or around the touchscreen. The proximity sensor may detect the presence or the absence of an object approaching a prescribed detecting surface or an object existing around the proximity sensor using an electromagnetic field strength or infrared ray without mechanical contact. Hence, the proximity sensor may last longer than a contact type sensor and also may be used more widely than a contact type sensor.

The proximity sensor may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it may be configured to detect the proximity of a pointer using a variation of electric field according to the proximity of the pointer. In this case, the touchscreen (touch sensor) may be classified as the proximity sensor.

For clarity and convenience of the following description, as a pointer becomes proximate to a touchscreen without coming into contact with the touchscreen, if the pointer is perceived as situated over the touchscreen, such an action shall be referred to as 'proximity touch.' If a pointer actually comes into contact with a touchscreen, such an action shall be referred to as 'contact touch.' A proximity-touched position over the touchscreen with the pointer may mean a position at which the pointer vertically opposes the touchscreen when the touchscreen is proximity-touched with the pointer.

The proximity sensor may detect a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern may be outputted to the touchscreen.

The audio output module 152 may function in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 may output audio relating to a particular function (e.g., call received, message received, etc.). The audio output module 152 may be often implemented using one or more speakers, buzzers, other audio producing devices, and combinations thereof.

The alarm unit 153 may output a signal for announcing the occurrence of a particular event associated with the mobile terminal 100. Typical events may include a call received event, a message received event and a touch input received event. The alarm unit 153 may be able to output a signal for announcing the event occurrence by way of vibration as well as video or audio signal. The video or audio signal may be outputted via the display 151 or the audio output unit 152. Hence, the display 151 or the audio output module 152 may be regarded as a part of the alarm unit 153.

The haptic module 154 may generate various tactile effects that can be sensed by a user. Vibration may be a representative one of the tactile effects generated by the haptic module 154. Strength and pattern of the vibration generated by the haptic module 154 may be controllable. For instance, different vibrations may be outputted in a manner of being synthesized together or may be outputted in sequence.

The haptic module 154 may be able to generate various tactile effects as well as the vibration. For instance, the haptic module 154 may generate the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 may be implemented to enable a user to sense the tactile effect through a muscle sense of finger, arm or the like as well as to transfer the tactile effect through a direct contact. Optionally, at least two haptic modules 154 may be provided to the mobile terminal 100 in accordance with the corresponding configuration type of the mobile terminal 100.

The memory unit 160 may generally be used to store various types of data to support the processing, control, and storage requirements of the mobile terminal 100. Examples of such data may include program instructions for applications operating on the mobile terminal 100, contact data, phonebook data, messages, audio, still pictures (or photos), moving pictures, etc. And, a recent use history or a cumulative use frequency of each data (e.g., use frequency for each phonebook, each message or each multimedia) may be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 may operate in association with a web storage for performing a storage function of the memory 160 on the Internet.

The interface unit 170 may be often implemented to couple the mobile terminal 100 with external devices. The interface unit 170 may receive data from the external devices or may be supplied with the power and then transfer the data or power to the respective elements of the mobile terminal 100 or may enable data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module may be a chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter referred to as 'identity device') may be manufactured as a smart card. Therefore, the identity device may be connectable to the mobile terminal 100 via the corresponding port.

When the mobile terminal 110 is connected to an external cradle, the interface unit 170 may become a passage for supplying the mobile terminal 100 with power from the cradle or a passage for delivering various command signals inputted from the cradle by a user to the mobile terminal 100. Each of the various command signals inputted from the cradle or the power may operate as a signal enabling the mobile terminal 100 to recognize that it is correctly loaded in the cradle.

The controller 180 may typically control the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 may be able to perform a pattern (or image) recognizing process for recognizing a writing input and a picture drawing input carried out on the touchscreen as characters or images, respectively.

The power supply unit 190 may provide power required by the various components for the mobile terminal 100. The power may be internal power, external power, or combinations thereof.

A battery may include a built-in rechargeable battery and may be detachably attached to the terminal body for charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For software implementation, the embodiments described herein may be implemented with separate software modules, such as procedures and functions, each of which perform one or more of the functions and operations described herein. The software codes may be implemented with a software application written in any suitable programming language and may be stored in memory such as the memory 160, and executed by a controller or processor, such as the controller 180.

Looking into the user input unit 130 again, since the user input unit 130 of the present disclosure is provided to a terminal backside, a front display may be formed as a wider screen. In the following description, a detailed configuration of arranging the user input unit 130 on the backside and an operation implemented by this configuration is explained in detail.

Figure 2A:
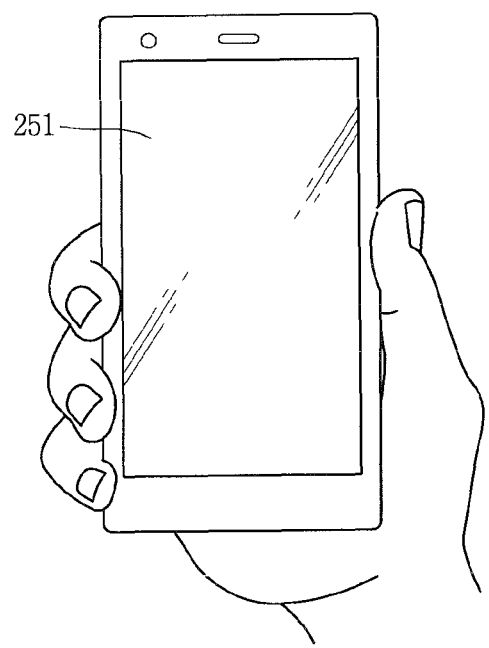
FIGS. 2A to 2C are diagrams for the concept of operations implemented by the present disclosure.
Figure 2B:
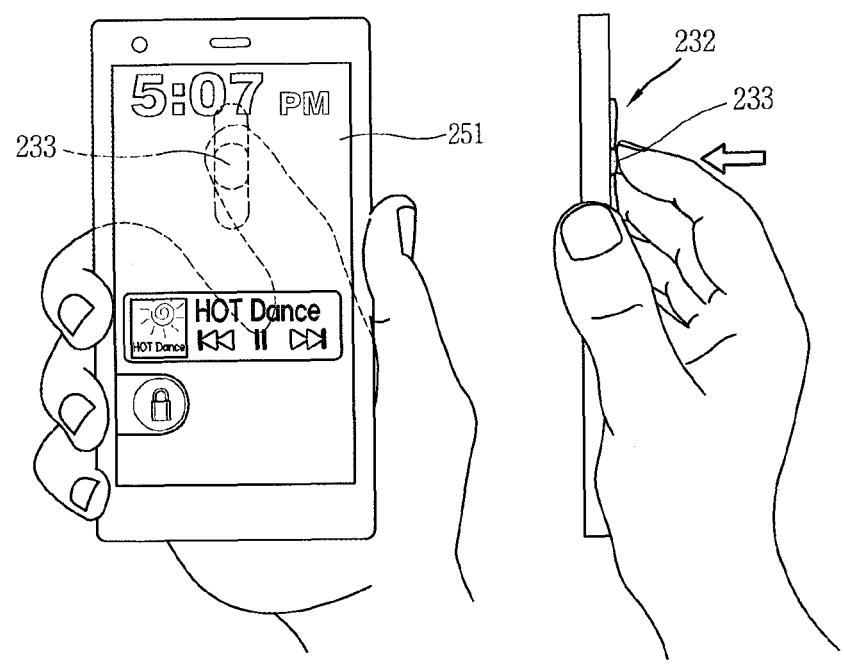
Figure 2C:
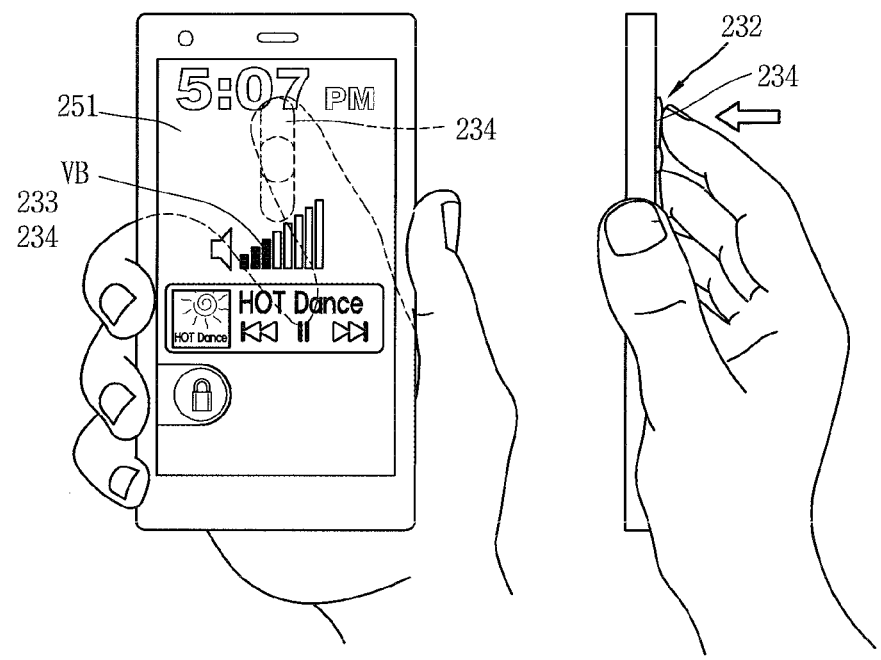

FIGS. 2A to 2C are diagrams for the concept of operations implemented by the present disclosure. Referring to FIG. 2A, a terminal may include a display unit 251 provided to one side of a main body, and more particularly, to a front side for example. A graphic user interface (GUI) of a currently active application may be outputted to the display unit 251. In order to enable a touch to be inputted to the GUI, the display unit 251 may include a touch sensor configured to sense or detect a touch input. The display unit 251 may output such visual information implemented like the GUI as an image, a text, an icon and the like. And, the display unit 251 may enter an inactive state, as illustrated in FIG. 2A, if a prescribed duration expires or a specific control command is inputted. This state is illustrated in FIG. 2A, which shows one example in which the display unit 251 is deactivated, for example, in the course of running a music player application.

Referring to FIG. 2B, a backside input unit 232 may be arranged on the other side of the main body, and more particularly, to a backside of the main body for example. A control command for the display unit 251 may be received via the backside input unit 232. In particular, if a push input is applied to a prescribed button 233 of the backside input unit 232, the display unit 251 may enter an active state. In particular, the backside input unit 232 may play a role as a power key for turning the display unit 251 on or off. Hence, the terminal itself may be turned on or off by the button 233. In the present drawing, as the display unit 251 is activated, the GUI of the music player application is outputted.

Referring to FIG. 2C, if a push input is applied to another button 234 of the backside input unit 232 in the state shown in FIG. 2B, a volume bar VB may be outputted and the volume may then be adjusted by manipulating the button 234, by which the present disclosure may be non-limited. Alternatively, the push input to the button 234 of the backside input unit 232 may become an input for volume adjustment in the state shown in FIG. 2A.

According to the above example, a user may be able to input a control command of a push type to the backside of the terminal while looking at the display unit 251. Consequently, the backside input unit provided to the terminal backside may be configured to receive an input of a push input. On some cases, the backside input unit may play roles as power and volume keys of the terminal.

In the following description, hardware configuration of the terminal performing the operations shown in FIGS. 2A to 2C is explained in detail with reference to the accompanying drawings.

Figure 3A:
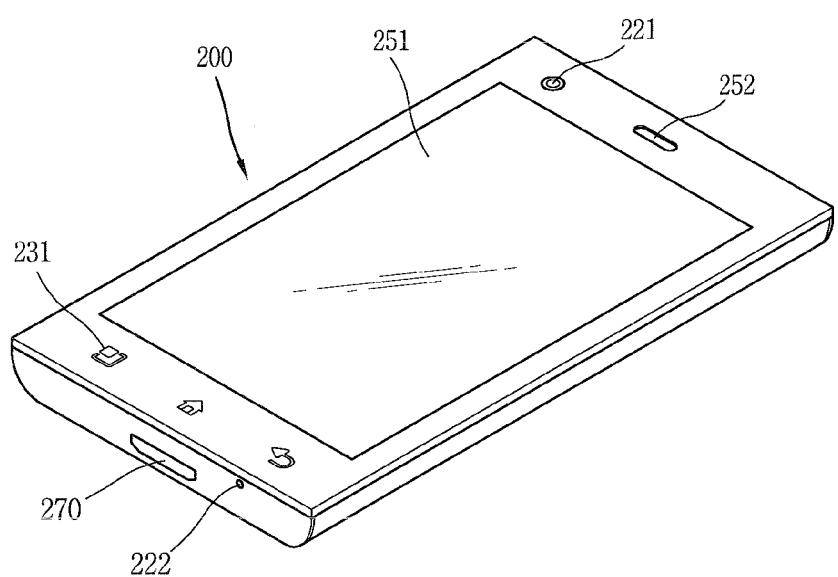
FIG. 3A is a front perspective diagram for one example of a mobile terminal according to one embodiment of the present disclosure.
Figure 3B:
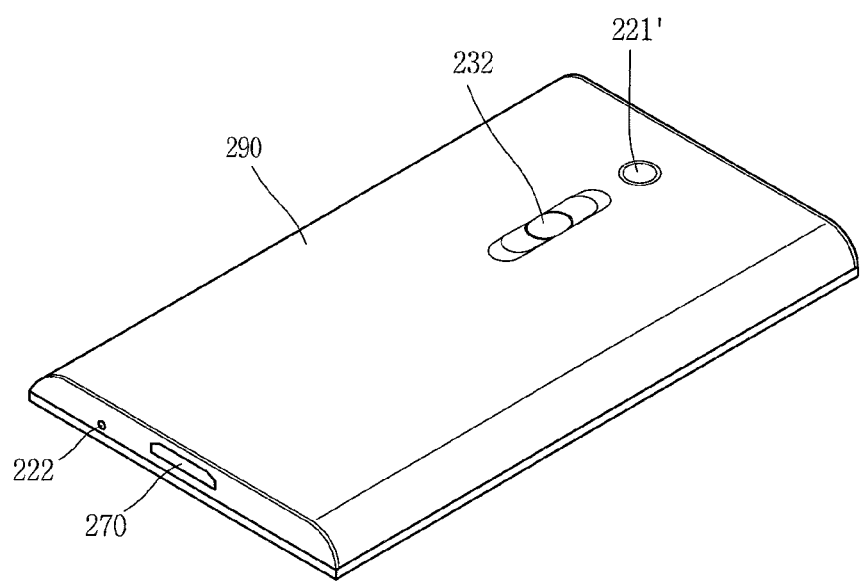
FIG. 3B is a rear perspective diagram of the mobile terminal shown in FIG. 3A.

FIG. 3A is a front perspective diagram for one example of a mobile terminal according to one embodiment of the present disclosure. FIG. 3B is a rear perspective diagram of the mobile terminal shown in FIG. 3A. A mobile terminal 200 may include a mobile phone body of a bar type, by which the present disclosure may be non-limited. Alternatively, the mobile terminal 200 may be implemented in a variety of different configurations. Examples of such configurations may include a slide type, a folder type, a swing type, a swivel type and the like, in which at least two bodies are assembled to enable relative motion.

The body may include a case (e.g., a casing, a housing, a cover, etc.) configuring an exterior of the body. According to the present embodiment, the case may be divided into a front case 201 and a rear case 202 (cf. FIG. 4). Various electric/electronic parts may be loaded in a space provided between the front and rear cases 201 and 202. Optionally, at least one middle case may be further provided between the front and rear cases 201 and 202. The cases 201 and 202 may be formed by injection molding of synthetic resin or metal substance such as stainless steel (STS), titanium (Ti) and the like for example.

A display unit 251, an audio output unit 252, a camera module 221 and the like may be provided to the terminal body, and mainly, to the front case 201. And, an interface 270 and the like can be provided to lateral sides of the front and rear cases 201 and 202.

The display unit 251 may occupy most of a main face of the front case 201. In particular, the display unit 251 may be provided to the front side of the terminal and configured to display visual information. The audio output unit 252 and the camera module 221 may be provided to a region adjacent to one of both end portions of the display unit 251, while a front input unit 231 and a microphone 222 may be provided to another region adjacent to the other end portion of the display unit 251.

For example, the user input unit 130 of FIG. 1 may include the front input unit 231 which may include a plurality of manipulating units. And, the manipulating units may generally be referred to as a manipulating portion, and may adopt any mechanism of a tactile manner that enables a user to perform a manipulating action by experiencing a tactile feeling. According to the present embodiment, the front input unit 231 may include a touch key, by which the present disclosure may be non-limited. Optionally, a push key may be added to the front input unit 231.

Moreover, the display unit 251 may configure a touchscreen together with a touch sensor. In this case, the touchscreen may play a role as a user input unit. Through this configuration, the front input unit may be omitted from the terminal front side. In this case, the mobile terminal may be configured to enable an input manipulation on the terminal body using the display unit 251 and a backside input unit 232 together, which will be described later.

Referring to FIG. 3B, a camera module 221' may be additionally provided to a backside of the terminal body, and more particularly, to the rear case 202. The camera module 221' may have a photographing direction that is substantially opposite to that of the former camera module 221 shown in FIG. 3A and may have pixels differing from those of the former camera module 221.

For instance, the front facing camera module 221 may have low pixels enough to take and transmit a picture of user's face for a video call or the like, while the rear facing camera module 221' may preferably have high pixels for capturing a general subject for photography without transmitting the captured subject instantly. And, each of the camera modules 221 and 221' may be installed at the terminal body to be rotatable or popped up.

A flash and a mirror may be additionally provided adjacent to the camera module 221'. The flash may project light toward a subject in case of taking a picture of the subject using the camera module 221'. In case that a user attempts to take a picture of the user (self-photographing) using the camera module 221', the mirror may enable the user to view his face reflected in the mirror.

An audio output unit may be additionally provided on the backside of the terminal body. The audio output unit provided on the backside may implement a stereo function together with the audio output unit 252 shown in FIG. 3A provided on the front side or may be used to enable speakerphone mode in case of making a phone call.

A power supply unit 290 for supplying power to the mobile terminal 200 may be provided on the terminal body. And, the power supply unit 290 may be configured to be built within the terminal body. Alternatively, the power supply unit 290 may be configured to be detachably connected to the terminal body.

In the drawings, the aforementioned backside input unit 232 may be provided on the backside of the terminal body. In particular, the backside input unit 232 may be situated under the camera module 221' for example.

The backside input unit 232 may be manipulated to receive an input of a command for controlling an operation of the mobile terminal 200. And, the inputted contents may be configured in various ways. For instance, such a command as power on/off, start, end, scroll, or the like, may be inputted to the backside input unit 232. Moreover, a command for volume adjustment of sound outputted from the audio output unit 252, a command for a switching to a touch recognition mode of the display module 251, or the like, may be inputted to the backside input unit 232.

The backside input unit 232 may be implemented as a device to receive a push input of a prescribed amount of force. In particular, the backside input unit 232 may include a mechanical or physical button, switch, or the like, in contrast to the touchscreen. In the following description, a configuration of the backside input unit 232 is explained in detail.

Figure 4:
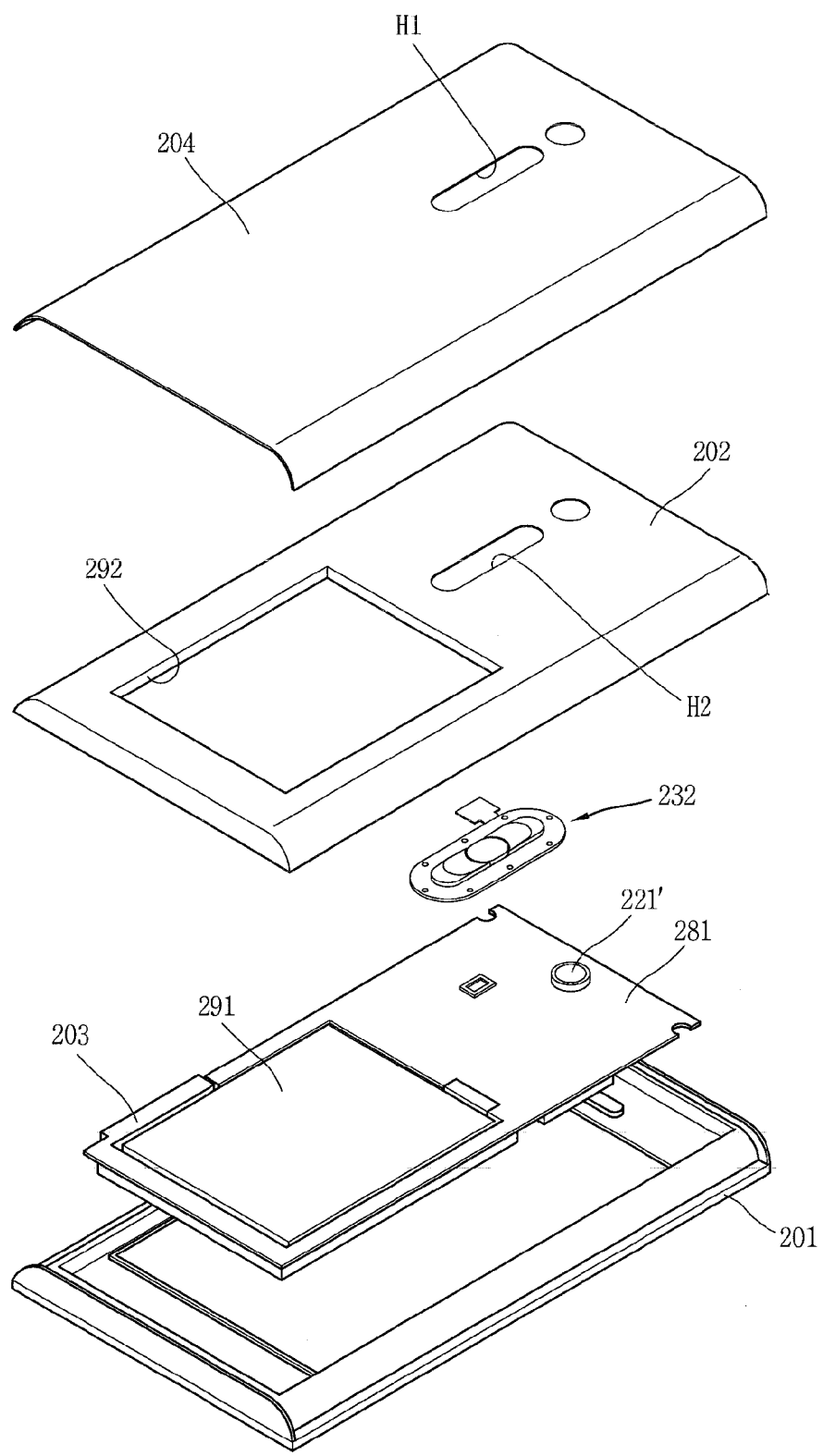
FIG. 4 is an exploded diagram of the mobile terminal shown in FIG. 3B.
Figure 5A:
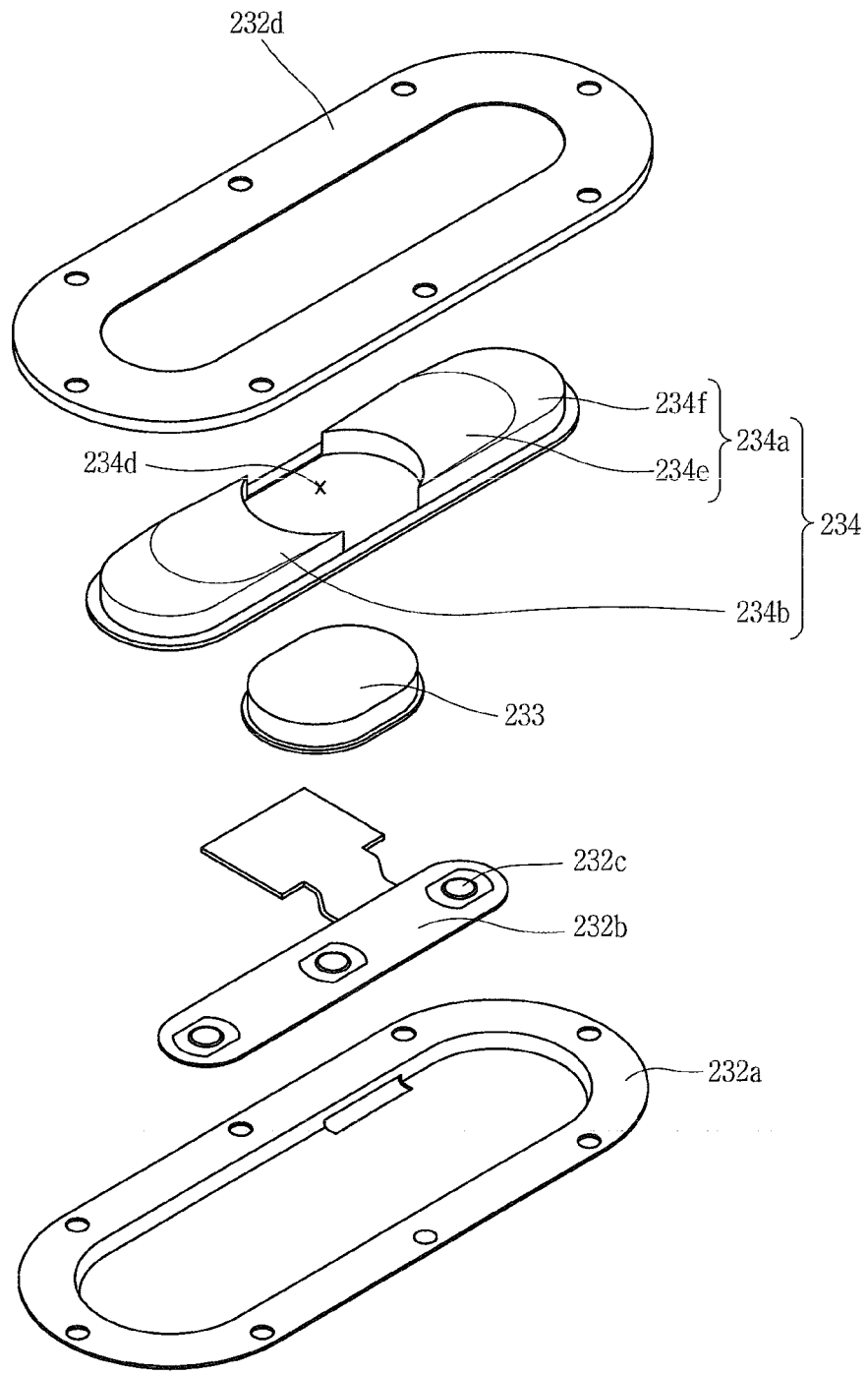
FIG. 5A and FIG. 5B are exploded and cross-sectional diagrams of a backside input unit shown in FIG. 4.
Figure 5B:
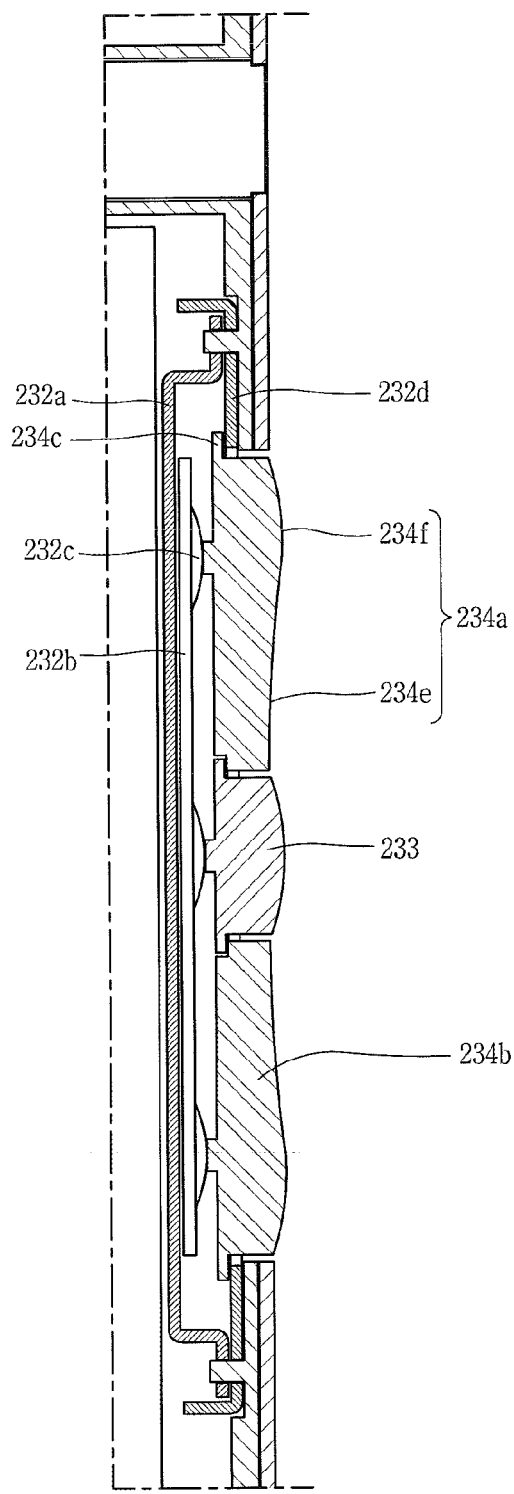

FIG. 4 is an exploded diagram of the mobile terminal shown in FIG. 3B. FIG. 5A and FIG. 5B are exploded and cross-sectional diagrams of a backside input unit shown in FIG. 4.

The backside input unit 232 is described with reference to FIGS. 4 to 5B. First of all, a printed circuit board (PCB) is built in the terminal body. In particular, the printed circuit board may be installed on one of the front case 201, the rear case 202, or the like. Alternatively, the printed circuit board 281 may be installed on a separate structure 203. The separate structure 203 may be a middle case. The following description is made on the assumption that the front case 201 and the rear case 202 are separately configured, by which the present disclosure may be non-limited. For instance, the cases 201, 203 and 204 may be formed or built as one body.

The printed circuit board 281 may be configured as one example of the controller 180 shown in FIG. 1 to activate and operate various functions of the mobile terminal. For instance, a plurality of printed circuit boards 281 may be provided to perform functions of the controller 180 in a manner of being combined with each other. In order to perform the functions, various electronic devices may be mounted on the printed circuit board 281.

The printed circuit board 281 may be electrically connected to an antenna and may also be configured to process wireless signals corresponding to radio electromagnetic waves transceived via the antenna. The antenna may be provided between the structure 203 and the printed circuit board 281 in a manner of penetrating the rear case 202, thereby transceiving the wireless signals.

The printed circuit board 281 may be electrically connected to the camera module 221'. A battery receiving part 292 may be formed in the rear case 202 to receive a battery 291 therein. And, a battery cover 204 may be provided to the rear case 202 to cover the battery receiving part 292.

Perforated holes may be formed in the rear case 202 and the battery cover 204, respectively. And, the camera module 221' may be arranged to face outward via the perforated holes. Moreover, the camera module 221' may be configured to photograph an external image via the backside of the terminal.

Regarding the backside input unit 232, in order to prevent a recess from being formed at the lateral side of the terminal body along the length direction by the user input unit, the backside input unit 232 may overlap the display unit 251 in a thickness direction of the body, thereby being exposed not via the lateral side but via the backside. In the following description, a detailed structure of the backside input unit 232 and a lateral structure of the terminal are explained in order.

First of all, the backside input unit 232 may be provided between the camera module 221' and the battery 291. A location of the backside input unit 232 may include a location overlapping with the display unit 251 shown in FIG. 3A on the front side. Through this, in using the mobile terminal, a user may recognize that an input device is likely to be arranged on a backside of the display unit 251. Yet, the present disclosure may be non-limited by such a location. For instance, the location of the backside input unit 232 may be changeable. In the drawings, the battery cover 204 may include a perforated hole H1 configured to correspond to the backside input unit 232. And, another perforated hole H2 may be formed in the rear case 202 to correspond to the former perforated hole H1.

Referring to FIGS. 5A and 5B, a support member 232a may be provided to the rear case 202 to support the backside input unit 232. In particular, the support member 232a may be provided to a location corresponding to the perforated hole H2. At least one portion of a bottom side of the support member 232a may form an opening. Wires of the printed circuit board 232b may electrically connect an inside and an outside of the support member 232a to each other through the opening. The printed circuit board 232b may include a flexible printed circuit board and may then be received in a center region of the support member 232a. And, a plurality of switches 232c may be arranged on the flexible printed circuit board. In this case, a plurality of the switches 232c may include a dome switch, a piezoelectric switch, or another appropriate type of switch or button.

The backside input unit 232 may include a first button part 233 and a second button part 234. The first button part 233 may be externally exposed from the backside of the terminal and may be configured to receive a push input of a first function. In this case, the first function may include a function related to a power-on/off of the power, an activation of the display unit or the like. Hence, as mentioned in the foregoing description with reference to FIG. 2A and FIG. 2B, the first button part 233 may play a role as a power key of the terminal.

The second button part 234 may include a plurality of keys 234a and 234b arranged on both sides centered around the first button part 233 and may be configured to receive a push input of a second function different from the first function. As mentioned in the foregoing description, the second function may be a function related to volume adjustment of an audio or sound outputted from the body of the terminal.

Moreover, a guide member 232d may be mounted on the support member 232a to guide a motion of the second button part 234. The second button part 234 may be inserted in a center portion of the guide member 232d. An edge portion of the guide member 232d may be coupled with the support member 232a. And, a holding wing may protrude along an outer circumference of the second button part 234 to be held by an inside portion of the edge portion of the guide member 232d.

The first button part 233 may be configured to penetrate the second button part 234, and more particularly, a portion between the keys 234a and 234b of the second button part. In particular, a perforated hole 234d may be formed in the second button part 234. Referring to the drawings, each of the keys 234a and 234b may include a projected surface that is externally exposed. An opposed surface of the projected surface may be configured as a flat surface. Through this configuration, a user may have tactile contact with a specific key.

In particular, in order to provide a height difference between the first button part 233 and each of the keys 234a and 234b, each of the keys 234a and 234b may have an inclining surface 234e configured to incline toward the perforated hole 234d. In this case, the inclining surface 234e may be the surface adjacent to the first button part 233 in the projected surface and may include a curved surface. The first button part 233 may be configured in a manner of being externally projected higher than an edge portion of the inclining surface 234e. An auxiliary inclining surface 234f, of which inclination is opposite to that of the inclining surface 234e, may be formed at a portion of each of the keys 234a and 234b adjacent to the guide member 232d. Moreover, the first button part 233 and the second button part 234 may be formed of different materials, respectively. Through the above-described structures and materials, a user may easily and conveniently distinguish between the first button part 233 and the second button part 234.

So far, according to the above description, 3 buttons (i.e., one key 233 provided to the center and other keys 234a and 234b) may be provided to the backside input unit 232, by which the present disclosure may be non-limited. For instance, the backside input unit 232 may include a single button. For another instance, the backside input unit 232 may include 5 buttons (e.g., a center-arranged key 233 and 4 keys arranged in 4 directions centering on the center-arranged key). Besides, in the following description, 3 buttons are assumed as being provided to the backside input unit. In this case, a function defined by an input to one of the 3 buttons may apply to the single button or the 5 buttons.

A backside input unit of the present disclosure may be non-limited by the above-described structures. In the following description, another embodiment of the backside input unit is explained with reference to the accompanying drawings.

Figure 6A:
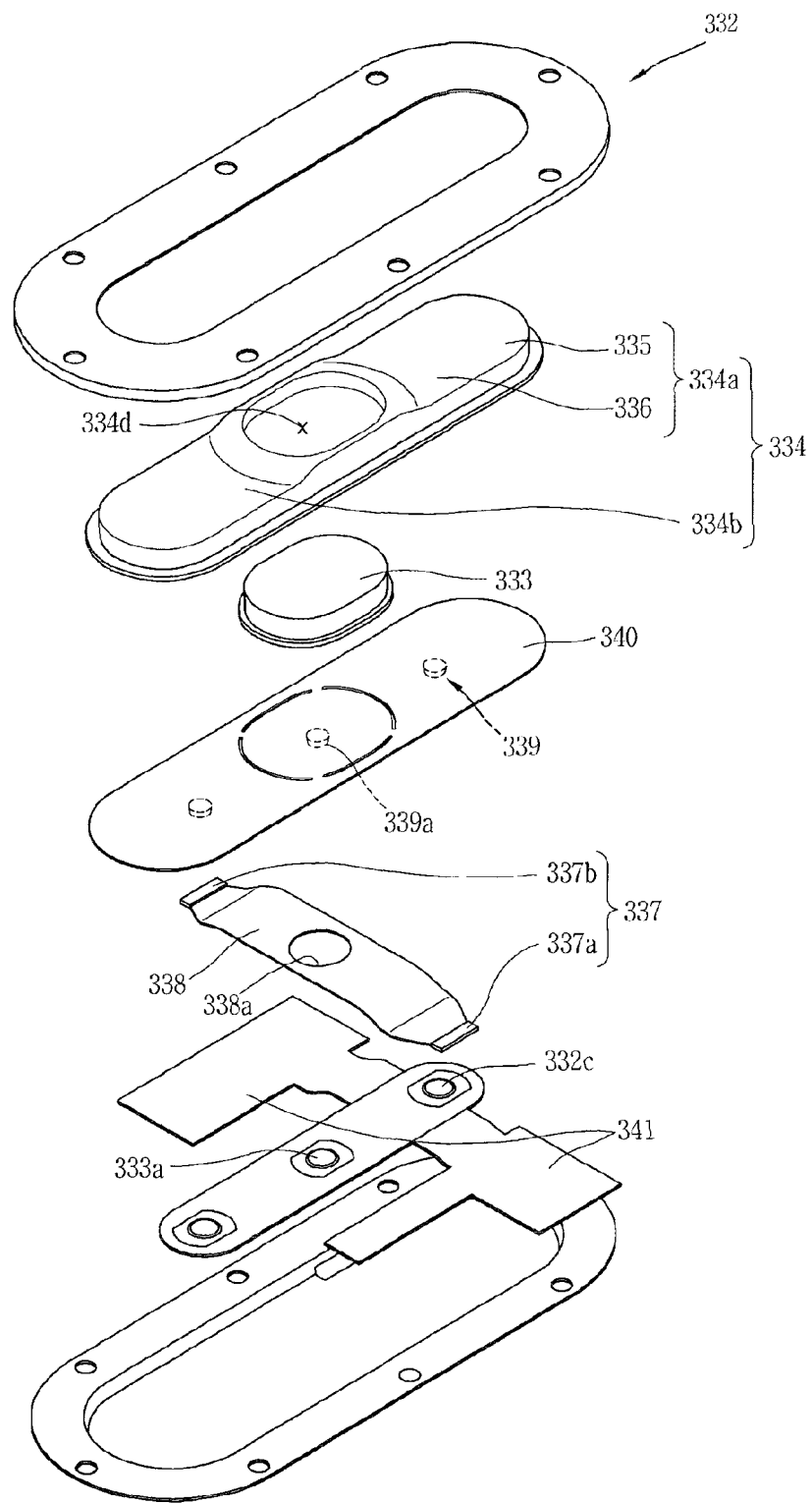
FIG. 6A and FIG. 6B are exploded and cross-sectional diagrams of a backside input unit according to another embodiment of the present disclosure.
Figure 6B:
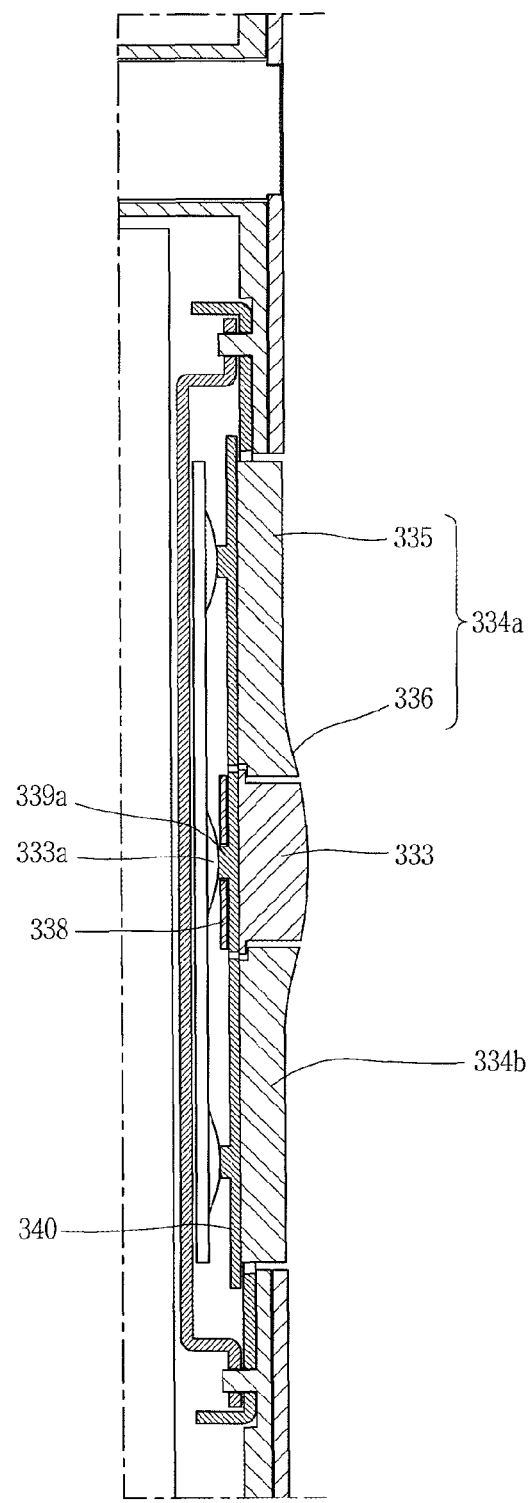

FIG. 6A and FIG. 6B are exploded and cross-sectional diagrams of a backside input unit according to another embodiment of the present disclosure. Regarding shapes of a first button part 333 and a second button part 334, unlike the former shapes of the former embodiment, the first button part 333 may be configured to be projected. For instance, each of keys 334a and 334b of the second button part 334 may have a flat portion 335 and an inclining portion 336.

The flat portion 335 may be configured parallel with the backside of the terminal body. A perforated hole 334d configured to receive the first button part 333 may be formed in the second button part 334 to arrange the first button part 333 between the keys 334a and 334b. And, the inclining portion 336 may be configured to incline from the flat portion 335 toward the perforated hole 334d. In this case, the first button part 333 may be configured to be projected from the flat portion 335 to be discriminated from the keys. The inclining portion 336 may be configured to incline from the flat portion 335 in the projected direction to smoothly connect the first button part 333 and each of the keys 334a and 334by to each other on the corresponding boundary in-between. Owing to this shape or configuration, referring to the drawings, although the first button part 333 is projected in part from the backside of the body, when the backside of the body comes in contact with an external object, the inclining portion 336 may prevent the first button part 333 from being pushed.

Meanwhile, the backside input unit 332 may be configured to enable external illumination. In particular, the backside input unit 332 may include a plurality of switches 332c, a light source 337 and a light guide 338.

A plurality of the switches 333a and 332c may be provided to correspond to the first button part 333 and the second button part 334, respectively, and may be arranged in a line. A plurality of the switches 333a, 332c may be mounted on the flexible printed circuit board and may include dome switches, piezoelectric switches and the like for example.

The light source 337 may be provided adjacent to a plurality of the switches 332c and may include an LED light or the like. For instance, the light source 337 may include first and second light sources 337a and 337b provided to both sides centering on the line formed by the switches 332c. In particular, the light sources may be provided to both sides of the switch 333a corresponding to the first button part 333.

The light guide 338 may be configured to cover at least one portion of a plurality of the switches 333a, 332c and may be connected to the light source 337 to guide the light emitted from the light source 337. For instance, the first and second light sources 337a and 337b may be connected to both end portions of the light guide 338. The light guide 338 may be arranged in a direction crossing with the line formed by a plurality of the switches 333a, 332c to cover the switch 333a that corresponds to the first button part 333.

In this case, the first button part 333 may be formed of transparent material to externally transmit the light generated from the light source 337. Moreover, the second button part 334 may be formed of non-transparent material to prevent the light from leaking externally.

Referring to the drawings, a member 340 having a projection 339 projected toward the switches 332 may be provided under the first button part 333 and the second button part 334. The member 340 may be formed of light-transmittive material to transmit light. One side of the member 340 may be connected to the first button part 333 and then second button part 334, while projections 339 respectively corresponding to the switches 332 are formed on the other side of the member 340. In this case, a slit may be formed around the projection 339a corresponding to the first button part 333. A perforated hole 338a may be formed in the light guide 338, thereby being penetrated by the projection 339a corresponding to the first button part 333. Owing to the above-described structure, a force of pushing the first button part 333 may be efficiently delivered to the corresponding switch.

So far, the above description mainly concerns the structure of the backside input unit 232. Yet, an operation of controlling the backside input unit available for a push input can be modified in various ways. In the following description, a modified example of a control operation via a backside input unit is explained with reference to the accompanying drawings. In the modified example or embodiment explained in the following description, wherever possible, the same reference numbers will be used throughout the drawings to refer to the same or similar parts of the former example, of which details can be substituted with those of the former example. Yet, although reference numbers for a backside input unit are given with reference to FIG. 5A and FIG. 5B, they may indicate the backside input unit shown in FIG. 6A and FIG. 6B. For clarity of the following description, the second button parts 234*a* and 234*b* provided to both sides next to the first button part 233 shall be named a '+' button and a '−' button, respectively. Moreover, a function defined by the '+' button and a function defined by the '−' button are switchably applicable.

If the display unit 151 includes a touchscreen, implementation of the present disclosure may be further facilitated. It is assumed in the following description that the display unit 151 includes the touchscreen.

Figure 7:
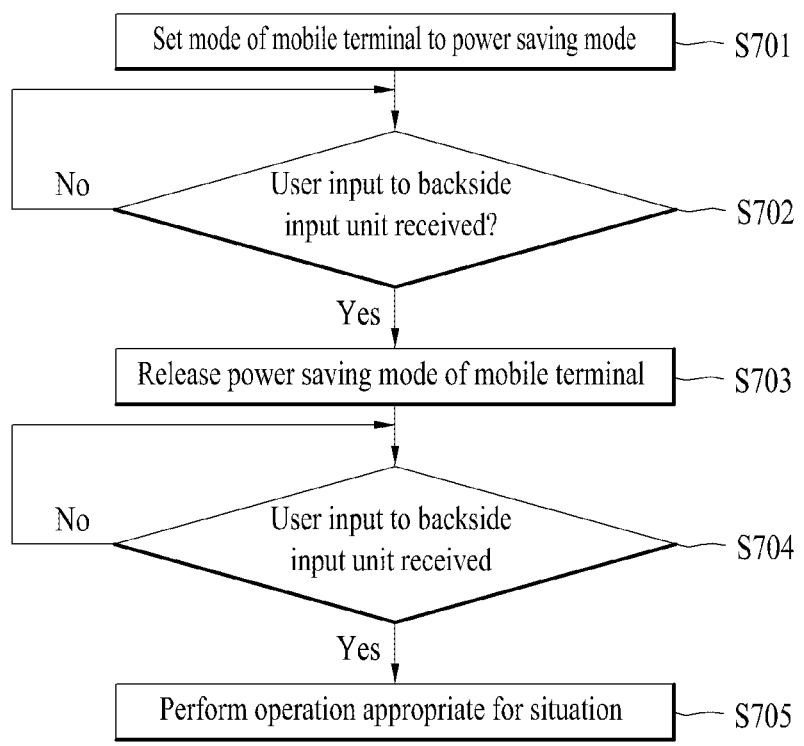
FIG. 7 is a flowchart for an operation of a mobile terminal according to the present disclosure.

FIG. 7 is a flowchart for an operation of a mobile terminal according to the present disclosure. While a mode of the mobile terminal 100 is set to a power saving mode, in step S701, if a push input of a prescribed combination is applied to the backside input unit 232 or a prescribed gesture input is applied in the course of pushing the backside input unit 232, in step S702, the controller may release the power saving mode of the mobile terminal 100, in step S703. In doing so, when the controller releases the power saving mode of the mobile terminal 100, the controller may control a predefined operation to be activated in response to a combination of the backside input units 232 or a type of a gesture additionally inputted in the course of pushing the backside input unit 232.

Here, the prescribed combination of inputs may be a combination of at least one of a button selection, gesture input such as moving the mobile terminal, input on the touchscreen, or another appropriate combination or pattern of inputs. The pattern of inputs may also include a sequence of the prescribed type of inputs, such as sequential inputs, simultaneous inputs, short push/press, press and hold, and the like.

For instance, FIG. 8 is a diagram of a mapping relation between an input combination for a backside input unit and a function or application indicated by the input combination. When the backside input unit 232 is manipulated by the example of the combination shown in FIG. 8, an operation of the mobile terminal 100 is described as follows.

Referring to FIG. 8, if a prescribed one of the backside input units 232 is pushed, as indicated by the input combination of an item #1, the controller may release the power saving mode of the mobile terminal 100 and also control a locked screen to be displayed on the display unit.

After the first button part 233 has been pushed, if the '−' button 234*b* is consecutively pushed twice, as indicated by the input combination of an item #2, the controller may release the power saving mode of the mobile terminal 100 and also control a camera application to be activated.

After the first button part 233 has been pushed, if the '+' button 234*a* is consecutively pushed twice, as indicated by the input combination of an item #3, the controller may release the power saving mode of the mobile terminal 100 and also control a quick memo application to be activated.

After the first button part 233 has been pushed, if the '−' button 234*b* is consecutively pushed twice and the '+' button 234*a* is then pushed twice, as indicated by the input combination of an item #4, the controller may release the power saving mode of the mobile terminal 100 and also controls the locked display unit to be unlocked.

While the mobile terminal 100 is set in the power saving mode, if a prescribed button is long pressed over a prescribed time, it may be mapped to a prescribed function. For instance, if the '+' button 234*a* or the '−' button 234*b* is long pressed over a prescribed time, as indicated by the input combination of an item #5, the controller may release the power saving mode of the mobile terminal and is also able to control a camera application to be activated.

The input combination indicated by one of the items #2 to #5 can be regarded as playing a role as a password in unlocking the locked display unit as well as releasing the power saving mode of the mobile terminal 100.

In the example shown in FIG. 8, the mobile terminal 100 may save the mapping relations (e.g., mapping table), between the input combinations for the back side input unit 232 and the functions desired to be linked to the input combinations in the storage unit (e.g., memory). In this case, if the backside input unit 232 is pushed in accordance with a prescribed combination, the controller 180 may extract a control command indicated by the pushed input combination from the mapping table and may then be able to execute the extracted control command.

Moreover, it should be apparent that various combinations of various types are available as well as the above described input combinations shown in FIG. 8. Furthermore, the mapping relation between an input combination and an application (or function) can be freely modified by a user.

In the example of the combinations shown in FIG. 8, the controller may release the power saving mode of the mobile terminal 100 in response to the initial push to the button (e.g., in response to the initial push to the first button part 233 according to one of the items #2 to #4) and may then be able to control a pre-designated application or function to be activated in accordance with the example of the combination of pushing the remaining buttons. In particular, in the items #2 to #4 shown in FIG. 8, if the first button part 233 is initially pushed, it may be able to control the mobile terminal 100 to be released from the power saving mode. Moreover, the rest of the push inputs may be provided to initiate a predefined function or application.

FIG. 9 is a diagram for an application to be activated per gesture type if a gesture is additionally inputted in the course of pushing a backside input unit. With reference to the combination examples shown in FIG. 9, when an input to the backside input unit 232 and a gesture are applied, an operation of the mobile terminal 100 may be described as follows.

Referring to FIG. 9, while the first button part 233 is pushed, if the mobile terminal 100 is shaken right and left, as indicated by an item #1, the controller may release the power saving mode of the mobile terminal 100 and may also be able to activate a first application. In doing so, the controller may recognize that the mobile terminal 100 is being shaken right and left using a detected signal of the sensing unit (e.g., at least one of a gyro sensor or an acceleration sensor).

While the first button part 233 is pushed, if the mobile terminal 100 is rotated over a prescribed amount (e.g., a predetermined angular range or an angle of origination), as indicated by an item #2, the controller may release the power saving mode of the mobile terminal 100 and may also be able to activate a second application. In doing so, the controller may recognize that the mobile terminal 100 has been rotated over the prescribed amount using a detected signal of the sensing unit (e.g., at least one of a gyro sensor or an acceleration sensor).

While the first button part 233 is pushed, if a user knocks (or taps) on the mobile terminal 100, as indicated by an item #3, the controller may release the power saving mode of the mobile terminal 100 and may also be able to activate a third application. In doing so, the controller may determine whether the user has knocked (tapped) on the mobile terminal 100 by analyzing an audio signal inputted via the microphone.

In the above description with reference to FIG. 9, the control commands, each of which is indicated by the combination in case of inputting an additional gesture in the course of pushing the first button part 233 included in the backside input unit 232, are explained. In addition to the control commands described with reference to FIG. 9, a combination, which corresponds to a case that an additional gesture is inputted in the course of pushing the second button part 234a and/or 234b, can be set to indicate a prescribed control command. A case of shaking the mobile terminal 100 right and left (e.g., horizontally) and a case of shaking the mobile terminal 100 top and down (e.g., vertically) may be set to indicate different control commands, respectively. A case of rotating the mobile terminal 100 counterclockwise and a case of rotating the mobile terminal 100 clockwise may be set to indicate different control commands, respectively. Moreover, a case of knocking (or tapping) on the mobile terminal 100 may be set to indicate a prescribed control command depending on the prescribed count of knocks (or taps) on the mobile terminal 100.

Combinations of additionally inputting a prescribed gesture in the course of pushing a backside input unit are exemplarily described with reference to FIG. 9. Unlike the description with reference to FIG. 9, a control command may be assigned to a combination of additionally inputting a prescribed gesture after pushing a backside input unit, a combination of pushing a backside input unit after inputting a prescribed gesture, or the like.

Like the example shown in FIG. 9, the mobile terminal 100 may save a mapping relation (e.g., a mapping table) between an input combination of the backside input unit 232 and a gesture and a prescribed function desired to be linked to the input combination in the storage unit. In this case, while the backside input unit 232 is pushed, if a prescribed gesture is inputted, the controller may extract a control command indicated by an input combination from the mapping table and may then execute the extracted control command.

According to the descriptions with reference to FIG. 8 and FIG. 9, when the mobile terminal 100 is in a power saving mode, a mapping table may be applicable for example. Moreover, when the display unit enters a locked state from the power saving mode or is unlocked, operations using the exemplarily shown mapping table may be applied.

After the power saving mode of the mobile terminal 100 has been released (or the locked display unit has been unlocked), if the backside input unit 232 is pushed, in step S704, the controller may perform an operation appropriate for a given situation, in step S705. For instance, the controller may determine a command to execute in response to a push input to the backside input unit 232 in accordance with a data type currently outputted through the display unit. This is described in detail with reference to FIGS. 10A to 10C as follows.

FIGS. 10A to 10C are diagrams for one example of a function performed by a push input to a backside input unit for various data types outputted via a display unit. Particularly, FIGS. 10A to 10C show examples of functions, each of which is activated by a push input to the second button part 234.

First of all, while a multimedia file including a video and audio data such as music and the like is being played, the controller may adjust a volume in response to a push input to the second button part 234. For instance, referring to FIG. 10A, while a video is being played, the controller may control the volume to be raised/lowered in response to a push input to the '+' button or '−' button 234a/234b.

If data (e.g., web page, document, image list, etc.), which includes an output quantity too large to be entirely displayed on the display unit, is being displayed on the display unit, the controller may scroll the data in response to a push input to the second button part. For instance, referring to FIG. 10B, if a webpage, which includes an output quantity of contents too large to be checked at a glance, is being displayed, the controller may scroll up/down the webpage in response to a push input to the '+' button or '−' button 234a/234b.

If such an image, a webpage, a document and the like applicable for a zoom function is being displayed, the controller may reduce or enlarge the data in response to a push input to the second button part. For instance, referring to FIG. 10C, if an image is being displayed, the controller may perform a command for zooming in/out on the image in response to a push input to the '+' button or '−' button 234a/234b.

In another example, the controller may determine a command to execute by a push input to the backside input unit 232 based on a direction of holding or gripping the mobile terminal 100. In doing so, whether the mobile terminal 100 is held in a landscape direction or a portrait direction may be determined using a detected or sensed signal of the sensing unit (e.g., at least one of a gyro sensor or an acceleration sensor). For example, if the mobile terminal 100 is held in the portrait direction, a scroll command may be executed through the backside input unit. In another example, if the mobile terminal 100 is held in the landscape direction, a volume control command may be executed through the backside input unit.

In another example, based on whether the display unit is touched in conjunction with an input pushing the backside input unit 232, the controller may determine a command to execute in response to a push input to the backside input unit 232. In particular, while the display unit is not touched, if the backside input unit 232 is pushed, the controller can control a first command to be executed. On the contrary, while the display unit is touched, if the backside input unit 232 is pushed, the controller may control a second command to be executed. This operation is described in detail with reference to FIGS. 11A to 11F as follows.

FIGS. 11A to 11F are diagrams for one example to describe that a different command is processed based on whether a display unit is touched when a backside input unit is pushed.

Figure 11A:
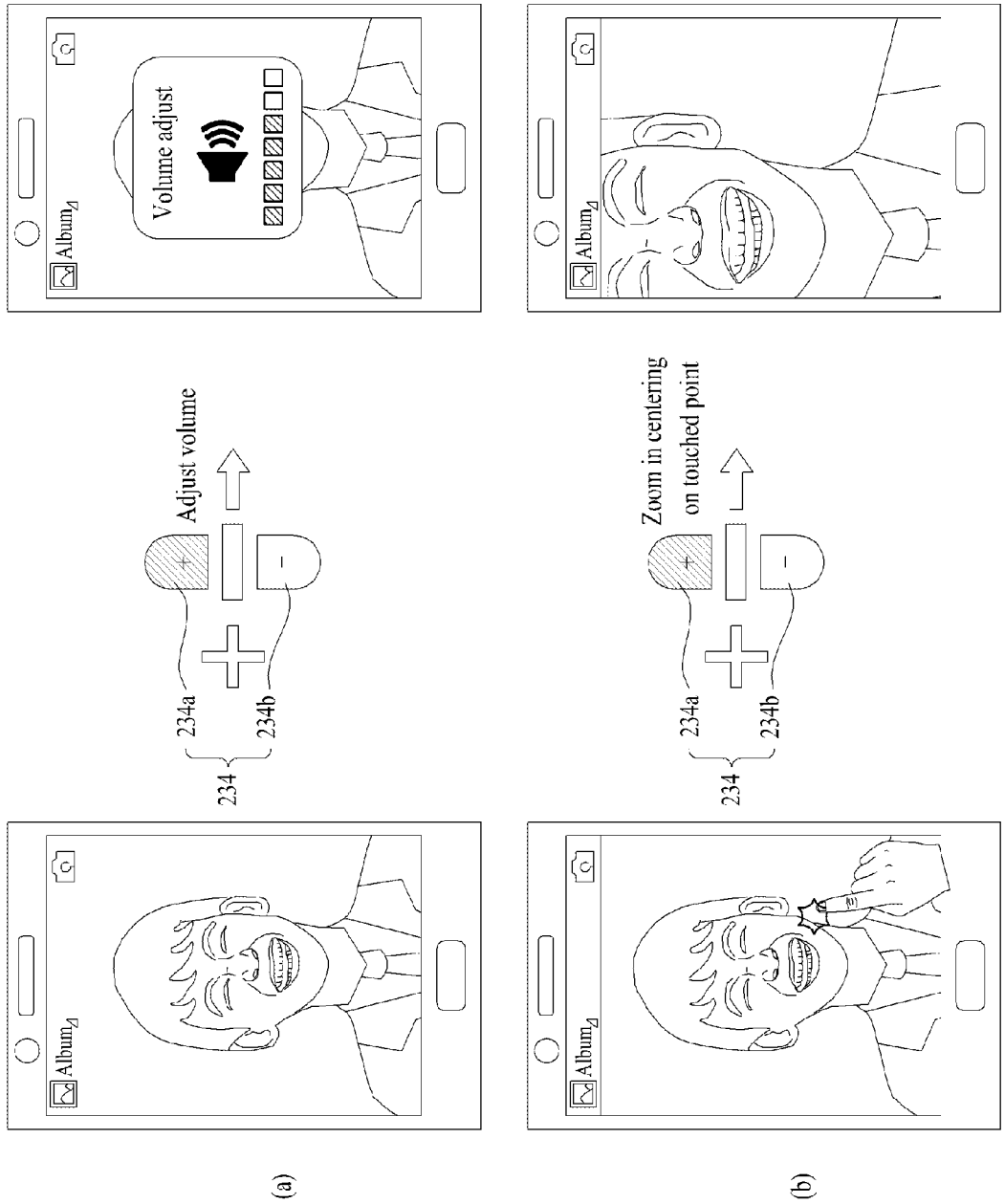

FIG. 11A shows one example of an operation of the mobile terminal 100 in response to a push input to the second button part 234 while a zoom-available data such as an image, a webpage, a document and the like is displayed. Referring to FIG. 11A (a), if the second button part 234 is pushed while the display unit is not touched, the controller may adjust a volume in response to a push input to the second button part. On the contrary, referring to FIG. 11A (b), if the second button part 234 is pushed while the display unit is touched, the controller may control the data to be enlarged or reduced in response to a push input to the second button part. For example, if the '+' button 234a is pushed, the data may be enlarged. For example, if the '−' button 234b is pushed, the data may be reduced. In doing so, the controller may zoom in or out on the data centering on a point touched by a user.

FIG. 11B is a diagram for one example of an operation of the mobile terminal 100 in response to a push input to the second button part 234 while data (e.g., a webpage, a document, an image list, etc.), which includes an output quantity too large to be entirely displayed on the display unit, may be displayed. Referring to FIG. 11B (a), if the second button part 234 is pushed while the display unit is not touched, the controller may adjust a volume in response to a push input to the second button part. On the contrary, referring to FIG. 11B (b), if the second button part 234 is pushed while the display unit is touched, the controller may control the data to be scrolled in response to a push input to the second button part. For example, if the '+' button 234a is pushed, the data may be scrolled up. For example, if the '−' button 234b is pushed, the data may be scrolled down.

FIG. 11C is a diagram for one example of an operation of the mobile terminal 100 in response to a push input to the second button part 234 while a data (e.g., a webpage, a document, an e-book, a memo, etc.) including a text is displayed. Referring to FIG. 11C (a), if the second button part is pushed while the display unit is not touched, the controller may adjust a volume in response to a push input to the second button part. On the contrary, referring to FIG. 11C (b), if the second button part is pushed as a specific text is selected by touching the display unit, the controller may search the selected text above or below the data. For example, if the '+' button 234a is pushed, the controller may search the text in a bottom direction. For example, if the '−' button 234b is pushed, the controller may search the text in a top direction.

FIG. 11D is a diagram for one example of an operation of the mobile terminal 100 in response to a push input to the first button part 233 while a data (e.g., a webpage, a document, an e-book, a memo, etc.) including a text may be displayed. Referring to FIG. 11D (a), if the first button part 233 is pushed while the display unit is not touched, the controller may enter a power saving mode in response to a push input to the first button part 233. On the contrary, referring to FIG. 11D (b), if the first button part 233 is pushed as a specific text is selected by touching the display unit, the controller may search a webpage for the selected text.

FIG. 11E is a diagram for one example of an operation of the mobile terminal 100 in response to a push input to the second button part 234 while a chat window for displaying chat contents with at least one counterpart may be displayed. Referring to FIG. 11E (a), if the second button part 234 is pushed while the display unit is not touched, the controller may adjust a volume in response to a push input to the second button part 234. On the contrary, referring to FIG. 11E (b), if the second button part 234 is pushed as the display unit is touched to select a specific user (e.g., User 1 in FIG. 11E), the controller may control a message sent previously or next by the selected user to be displayed. For example, if the '+' button 234a is pushed, the controller may control the message previously sent by the selected user to be displayed. For example, if the '−' button 234b is pushed, the controller may control the message sent next by the selected user to be displayed.

FIG. 11F is a diagram for one example of an operation of the mobile terminal 100 in response to a push input to the first button part 233 while a chat window for displaying chat contents with at least one counterpart may be displayed. Referring to FIG. 11F (a), if the first button part 233 is pushed while the display unit is not touched, the controller may enter a power saving mode in response to a push input to the first button part 233. On the contrary, referring to FIG. 11F (b), if the first button part 233 is pushed as the display unit is touched to select a specific user (e.g., User 1 in FIG. 11E), the controller may control a message sent by the selected user to be displayed only.

Referring to the examples shown in FIGS. 11A to 11F, when the backside input unit 232 is pushed, the controller may process a different command (e.g., a first command, a second command, etc.) based on whether the display unit is touched.

In certain embodiments, feedback such as graphical feedback corresponding to inputs at the backside input unit 232 may be output. Since the backside input unit 232 is located on the backside of the mobile terminal, the backside input unit 232 may not be visible to the user while operating the backside input unit 232. Hence, it may cause a problem that a user may frequently apply an incorrect button input. In order to prevent such problems, the controller may control an appropriate feedback to be outputted each time the backside input unit 232 is pushed. This is described in detail with reference to FIG. 12 as follows.

FIG. 12 is a diagram for one example of a feedback outputted when a backside input unit is pushed. FIG. 12 (a) shows on example of outputting a feedback through a light source unit. FIG. 12 (b) and FIG. 12 (c) show examples of outputting a feedback through the display unit.

The mobile terminal 100 may include a light source unit 1210 configured to emit light. In particular, the light source unit 1210 may include such a light source such as an LED, an OLED or the like. Particularly, referring to FIG. 12 (a), the light source unit 1210 may be provided to a front side of the mobile terminal 100 in a manner of being externally exposed.

If the backside input unit 232 is pushed, referring to FIG. 12 (a), the controller may control the light source unit 1210 to emit light as a feedback in response to the push input. In order to discriminate inputs at the first button part 233 to inputs at the second button part 234 from each other, the two cases may be discriminated from each other in a manner of outputting lights differing from each other in color (e.g., outputting a first color light in case of pushing the first button part 233, outputting a second color light in case of pushing the second button part 234, etc.) or adjusting a blinking count of the light source unit 1210 (e.g., blinking once in case of pushing the first button part 233, blinking twice in case of pushing the second button part 234, etc.). Moreover, in order to discriminate the '+' button 234a and the '−' button 234b from each other, an input at the '+' button 234a and an input at the '−' button 234b may be discriminated from each other in a manner of outputting lights differing from each other in color or adjusting a blinking count of the light source unit 1210.

Furthermore, the controller may control the light source unit 1210 to output whether a combination of inputs matching a combination inputted to the backside input unit 232 exists in a mapping table. For instance, if a combination of inputs matching a combination inputted to the backside input unit 232 does not exist in a mapping table, the controller may control the light source unit 1210 to output red. For another instance, if a combination of inputs matching a combination inputted to the backside input unit 232 exists in a mapping table, the controller may control the light source unit 1210 to output green. Hence, the controller may guide whether a user has manipulated the backside input unit 232 with an appropriate combination.

The controller may control a feedback to be outputted through the display unit. For instance, if the backside input unit 232 is pushed, referring to FIG. 12 (b), the controller may control indicators 1222, 1224 and 1226 to be displayed on the display unit to indicate the pushed button. Particularly, the controller may control the indicators 1222, 1224 and 1226 to be cumulatively displayed for push inputs consecutively inputted within a prescribed time, thereby providing a user with information on a combination inputted so far. For instance, referring to FIG. 12 (b), since the indicator for the '+' button 1222, the indicator for the '+' button 1224 and the indicator for the '−' button 1226 are currently displayed [cf.

1210], a user may easily and conveniently recognize that the '+' button 234a has been pushed twice and that the '−' button 234b has been pushed once.

For another instance, referring to FIG. 12 (*c*), the controller may control a feedback to be outputted using an object 1230 taking after a shape of the backside input unit 232. For instance, the controller may change a color of a region corresponding to a pushed button in the object 1230, thereby guiding the pushed button to a user. For example, in the example shown in FIG. 12 (*c*), first to third regions of the object 1230 may correspond to the '+' button 234a, the first button part 233 and the '−' button 234b, respectively.

In one embodiment, soft keys corresponding to the buttons on the backside input unit 232 may be provided. In certain situations, since the backside input unit 232 is situated on the backside of the mobile terminal 100, when the mobile terminal 100 is placed on a surface facing up, the backside input unit 232 may not be readily accessible. In particular, in order to manipulate the backside input unit 232, a user should pick up the mobile terminal 100 to hold in user's hand.

To address such inconvenience, the controller may control a virtual soft key, which is implemented by software to replace the backside input unit 232, to be displayed. The control may handle a touch input to the soft key as equal as a push input to the backside input unit 232. While the soft key is displayed, the controller may handle a push input to the backside input unit 232 as usual, thereby enabling a user to use one of the soft key and the backside input unit 232. And, the controller may ignore a push input to the backside input unit 232, thereby forcing the user to use the soft key. The soft key is described in detail with reference to FIGS. 13A to 13C as follows.

Figure 13A:
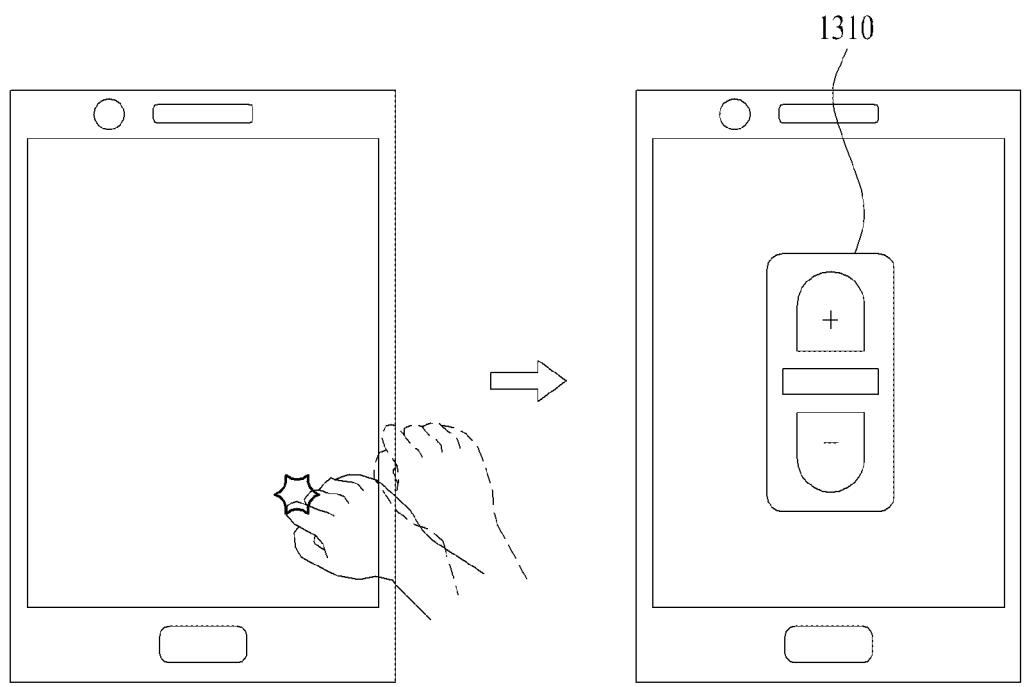
FIGS. 13A to 13C are diagrams for one example to describe that a soft key is displayed.
Figure 13B:
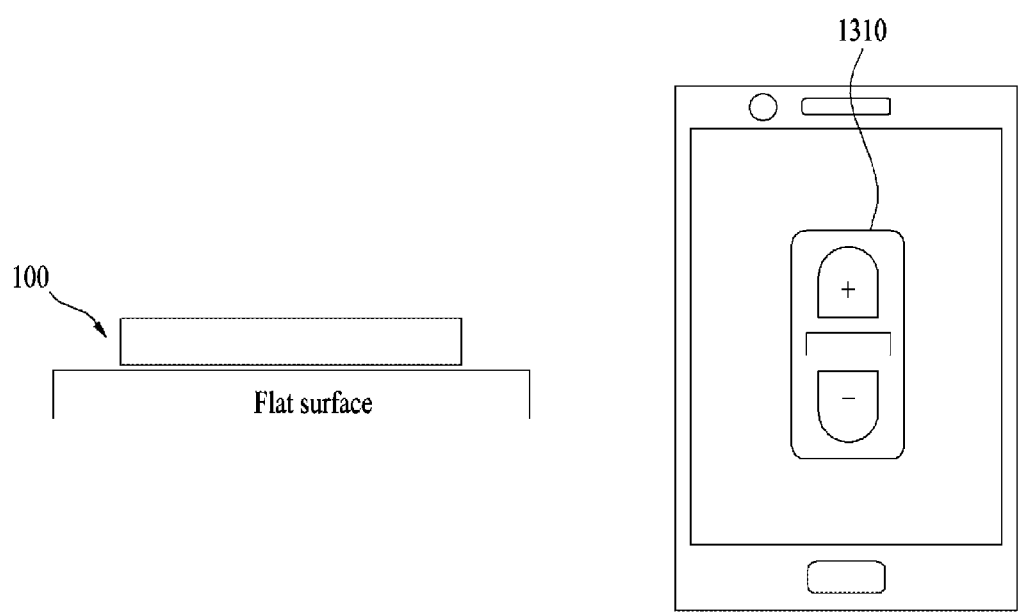
Figure 13C:
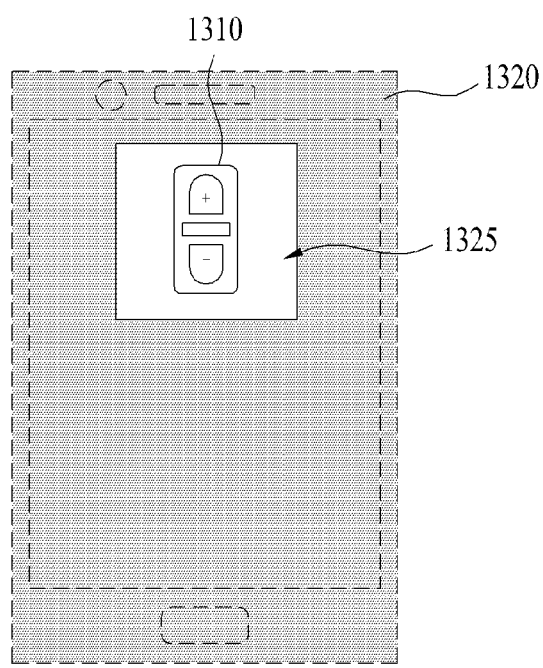

FIGS. 13A to 13C are diagrams for one example to describe that a soft key is displayed. First of all, the controller may control a soft key 1310 to be displayed in response to a user input for displaying the soft key 1310. For instance, referring to FIG. 13A, if a user knocks (or taps) on the mobile terminal 100, the controller may control the soft key 1310, which may replace the backside input unit, to be displayed in response to the user's gesture.

In another example, if the controller determines that a user is unable to appropriately manipulate the backside input unit 232, the controller may control the soft key 1310, which may replace the backside input unit 232, to be displayed automatically or in a manner of waiting for a user input. For example, referring to FIG. 13B, when the mobile terminal 100 is placed on a flat surface and the backside input unit 232 is not readily accessible, if a prescribed user input is applied the controller may control the soft key 1310, which may replace the backside input unit 232, to be displayed automatically or in a manner of waiting for a user input. If the sensing unit (e.g., at least one of a gyro sensor or an acceleration sensor, etc.) fails in detecting a motion for prescribed duration or the controller recognizes that the mobile terminal 100 has been maintained at a level for prescribed duration through the sensing unit (e.g., at least one of a gyro sensor or an acceleration sensor, etc.), the controller may determine that the mobile terminal 100 is lying on a flat surface.

In order to protect the mobile terminal 100 from external impact or shock, a protective cover 1320 may be used to cover the display unit. The protective cover 1320 applicable to the mobile terminal 100 according to the present disclosure may include an opening 1325 (or window) configured to open a portion of the display unit instead of covering the whole display unit. If the display unit is covered with the protective cover 1320, referring to FIG. 13C, the controller may control the smart key 1310 to be displayed on an uncovered region of the display corresponding to the opening 1325.

A location and size of the soft key may be set to be adjustable by a user. If a user intends not to use the soft key for a while, the controller may control an object, which takes after a shape of the backside input unit 232, to be displayed in place of the soft key. This is described in detail with reference to FIG. 14 as follows.

Figure 14:
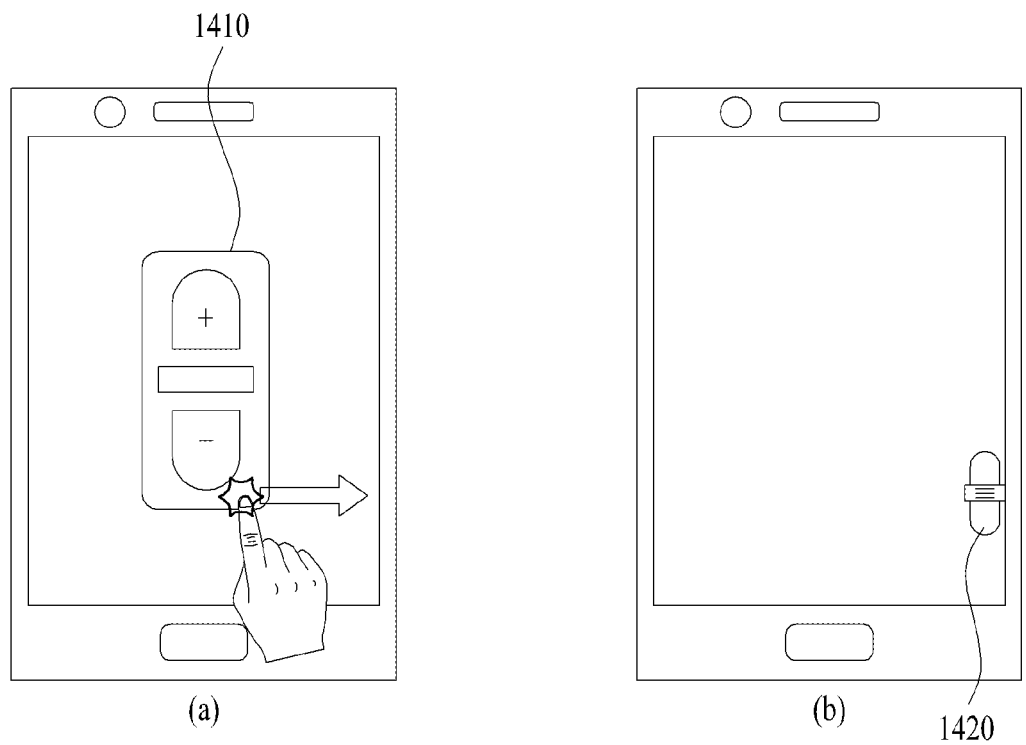
FIG. 14 is a diagram for one example of displaying an object taking after a shape of a backside input unit by replacing a soft key.

FIG. 14 is a diagram for one example of displaying an object taking after a shape of a backside input unit by replacing a soft key. While a soft key 1410 is displayed, if a user input of flicking the soft key 1410 in one direction is received as illustrated in FIG. 14 (*a*), the controller may determine that the user intends not to use the soft key 1410 for a while and display a reduced size version of an object 1420 to be displayed, as illustrated in FIG. 14 (*b*). A location of the object 1420 may be changed by a user. In doing so, the controller may control the object 1420 to be situated on an edge part of the display unit only. This is to secure visibility of information outputted to the touchscreen since outputting the object 1420. If the displayed object 1420 is touched, the controller may return to the example shown in FIG. 14 (*a*) and then control the soft key 1410 to be displayed again.

If the mobile terminal 100 lies face down, a user may directly observe the backside input unit 232. In doing so, the controller may enable the user to check a simple information through a manipulation of the backside input unit 232 or to cope with an occurring event through a manipulation of the backside input unit 232, without confirming an output of the display unit.

For instance, if the mobile terminal 100 lies face down (e.g., the display unit is placed toward a ground), if the backside input unit 232 is appropriately manipulated (e.g., the first button part 233 is consecutively pushed twice), the controller may control a current hour or an information (e.g., a detailed content of a received message, a detailed content of an absent call, etc.) on an event occurrence to be outputted in speech. Hence, a user may check the simple information without directly looking at the display unit.

In another example, while the mobile terminal 100 lies face down, assume a case of an incoming call. Here, if a user appropriately manipulates the backside input unit 232 (e.g., the user pushes the '+' button 234a and then pushes the '−' button 234b), the controller may respond to the incoming call and controls a speakerphone mode to be automatically entered. Hence, the user may proceed to a phone call without lifting up the mobile terminal 100.

Figure 15A:
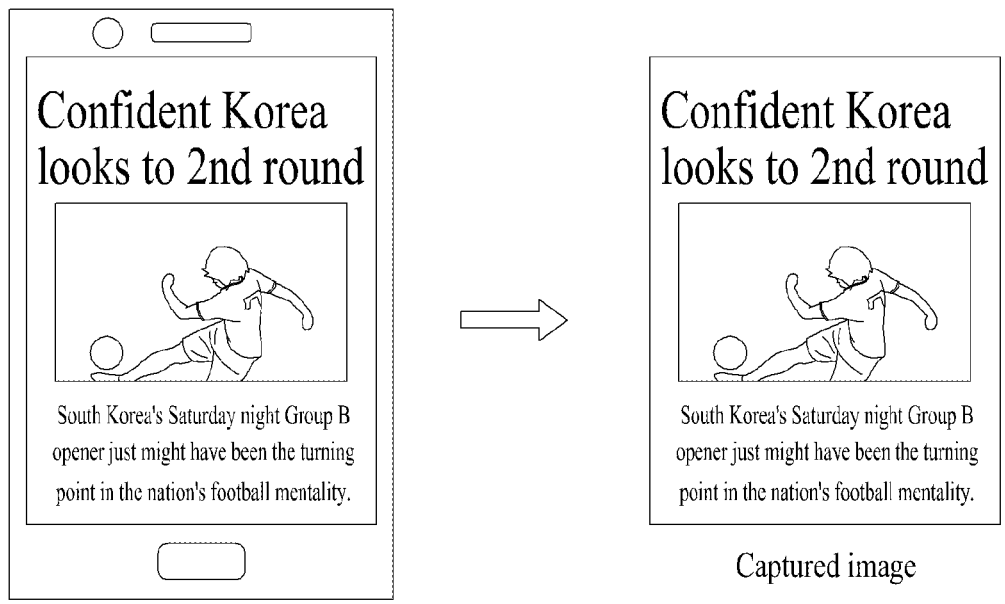

FIG. 15A and FIG. 15B are diagrams for one example to describe a capture function. In case of attempting to capture an information outputted via the display unit, the mobile terminal 100 according to the present disclosure may provide an extended capture function capable of enlarging or reducing a capture region based on a manipulation on the backside input unit 232. This is described in detail with reference to FIG. 15A and FIG. 15B as follows.

Referring to FIG. 15A, generally, if a user command for capturing an information outputted through the display unit is inputted, the controller may control the information outputted through the display unit to be exactly created as a capture image.

Referring to FIG. 15B, if a user command for capturing an information outputted through the display unit is inputted, the mobile terminal 100 according to the present disclosure may control a setting screen for setting a capture region to be displayed. While the setting screen for capturing the capture region is displayed, if the '+' button or '−' button 234a/234b is inputted, the controller may control the capture region to be enlarged or reduced. For instance, if the '+' button 234a is touched, the controller may control a region 1510, which was previously not displayed on the display unit to be included in the capture region FIG. 15B. Hence, if the extended capture function described with reference to FIG. 15A is used, it may be able to create a capture image larger/smaller than that of the general capture function described with reference to FIG. 15A.

The controller of the present disclosure may discriminate a case of inputting a user input for using a general capture function and a case of inputting a user input for using an extended capture function from each other. Hence, the controller may create the capture image by the general capture function, as illustrated in FIG. 15A. Moreover, the controller may create the capture image by the extended capture function, as illustrated in FIG. 15B.

In this case, the user input for activating the general capture function or the extended capture function may include one of a gesture for covering the display unit with a palm, an action of pushing at least two buttons of the backside input unit 232 substantially at the same time, and an action of touching a prescribed button displayed on the display unit in the course of pushing at least one of the backside input unit 232. Moreover, inputs of various types may be set as user inputs for activating a general capture function or an extended capture function, respectively.

When a power of the mobile terminal 100 is turned on or the locked display unit is unlocked, the backside input unit 232 may be used to set up a user account. For instance, while none of the backside input unit 232 is pushed, if the power of the mobile terminal 100 is turned on, the controller may set up the mobile terminal 100 in accordance with an account of a first user. On the other hand, while at least one of the backside input unit 232 is inputted, if the locked display unit is unlocked, the controller may set up the mobile terminal 100 in accordance with an account of a second user or a guest account.

For photographing, if a camera application is activated, the controller may control a preview image inputted from the camera to be displayed on the display unit. In doing so, the controller may adjust zooming of the camera or take a photo based on a user input to the backside input unit 232.

Figure 16:
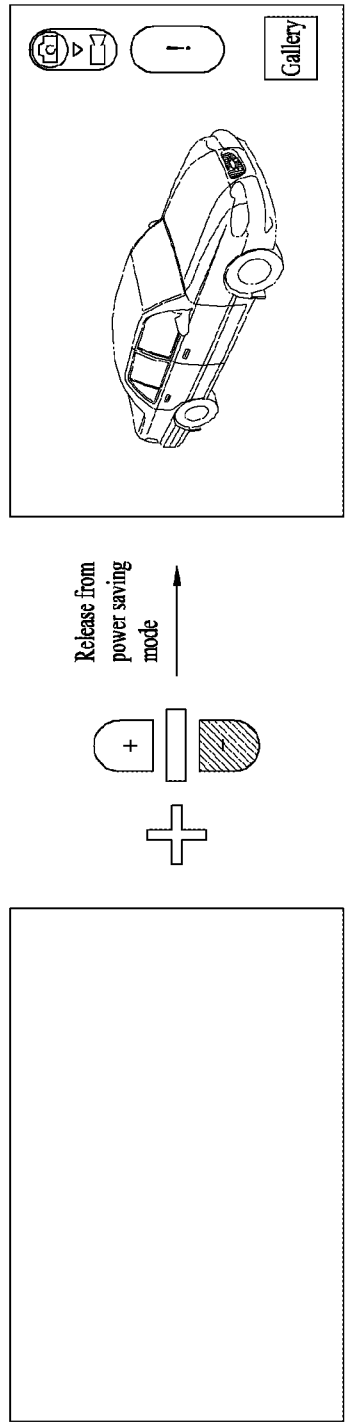
FIGS. 16 to 18 are diagrams for examples of outputs when a backside input unit is manipulated in the course of activating a camera application.
Figure 17:
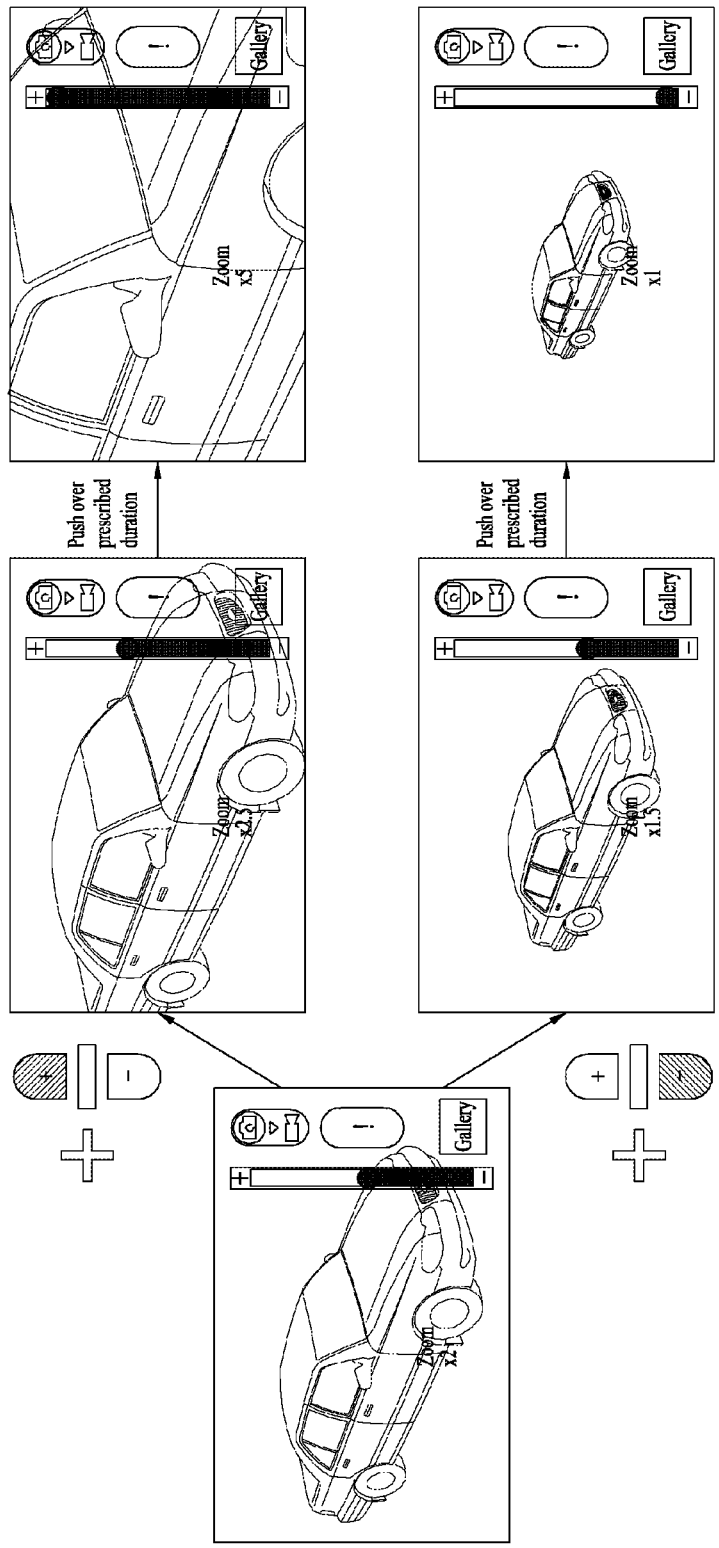
Figure 18:
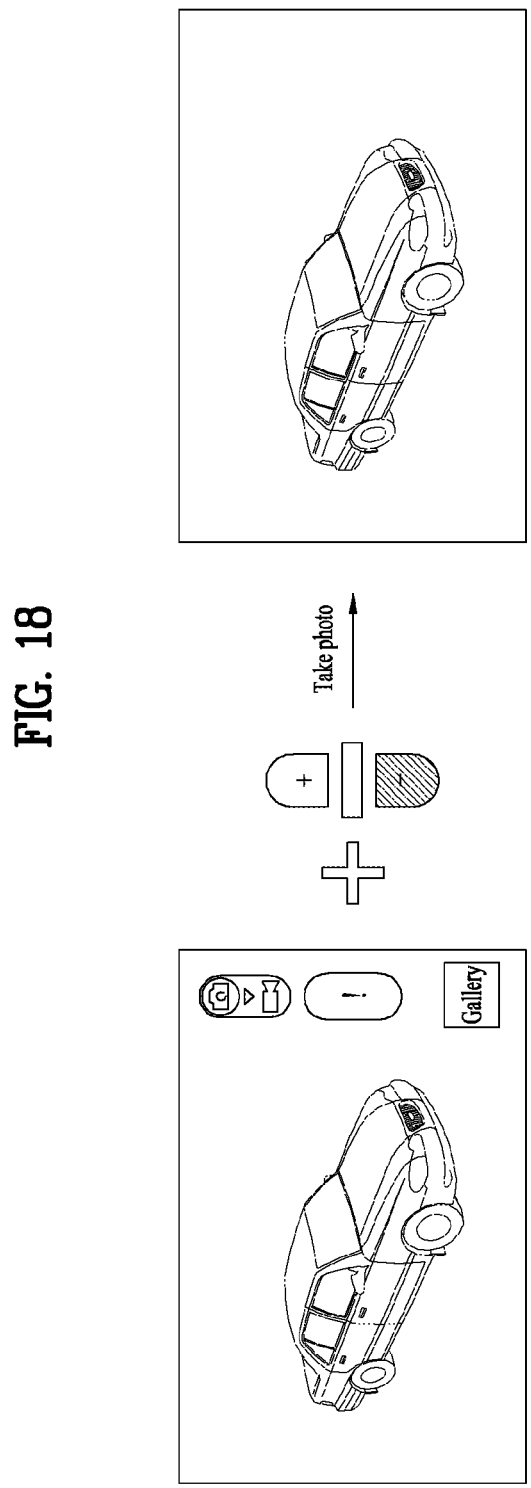

FIGS. 16 to 18 are diagrams for examples of outputs when a backside input unit is manipulated in the course of activating a camera application. As described in FIG. 8, if the backside input unit 232 is manipulated in a prescribed manner when a mobile terminal 100 is in a power save mode (e.g., '−' button is pushed for a prescribed time, as illustrated in FIG. 8, item 4), the controller 180 may control the camera application to be activated together with exiting the power save mode. Although a password is set to enter a normal mode from the power save mode, the controller 180 may execute the camera application. As a result, the user may easily start the camera application, without entering password in mobile terminal 100. After the camera application is executed, a variety of functions may be performed based on an input via the backside input unit 232.

FIG. 17 shows one example of adjusting a zooming of a camera based on a user input to the backside input unit 232. FIG. 18 shows one example of taking a photo based on a user input to the backside input unit 232. As the camera application is activated, while a preview image is displayed, referring to FIG. 17, if one of the '+' button or '−' button is pushed, the controller may control the camera to zoom in/out. For example, if the '+' button is pushed, the camera may zoom in, and if the '−' button is pushed, the camera may zoom out. In doing so, if the pushed state of the '+'/'−' button is maintained over prescribed duration, the controller may control the camera to zoom in/out to the maximum.

Referring to FIG. 18, while the camera application is active and a preview image is displayed, a user input to the backside input unit 232 may be applied to take a photo. For instance, while a preview image is displayed, if the '−' button is pushed, the controller may take a photo and control the captured photo to be displayed.

The controller of the present disclosure may discriminate a case of activating the camera application through a manipulation of a backside input unit and a case of activating the camera application through a touch input to the display unit from each other, thereby controlling a photo to be taken based on the user input to the backside input unit 232 in the former case only.

The controller of the mobile terminal 100 according to the present disclosure may adjust a location of a cursor indicating a location of a button to be pushed by a user through the display unit or controls an object indicated by the cursor to be selected, through the display unit based on a user input to the backside input unit 232. If the backside input unit 232 includes a key 233 provided to a center and 4 keys arranged in 4 directions centering on the center key 233, adjustment of the location of the cursor may be further facilitated. This is described in detail with reference to FIG. 19 as follows.

Figure 19:
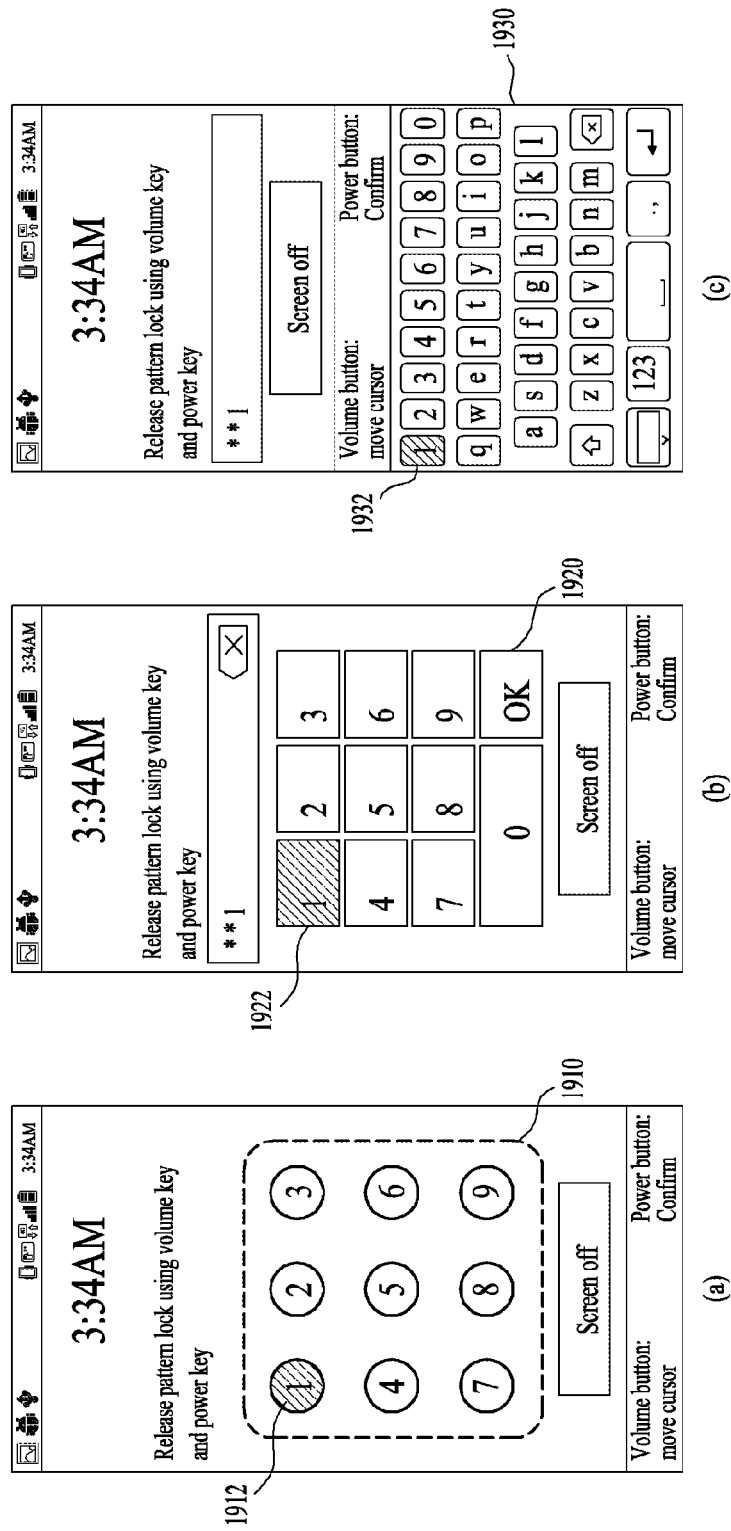
FIG. 19 is a diagram for one example of adjusting a location of a cursor based on a user input to a backside input unit.

FIG. 19 is a diagram for one example of adjusting a location of a cursor based on a user input to a backside input unit. If the display unit enters a locked state, an input pad for relating the locked state may be displayed. For instance, a different input pad may be displayed in accordance with a type of a password for releasing the locked state of the display unit. FIG. 19 (a) shows one example that an input pad 1910 for inputting a pattern password is displayed. FIG. 19 (b) shows one example for a number pad 1920 for inputting a numerical passcode and FIG. 19 (c) shows an example including an input pad 1930 for inputting a password including a text string is displayed.

The controller may control a cursor 1912/1922/1932 to be displayed to indicate a prescribed key on the input pad. In doing so, the 4 direction keys of the backside input unit may be provided to move the cursor 1912/1922/1932 in top, bottom, right and left directions, respectively. And, the key 233 provided to the center of the backside input unit may be provided to select a key indicated by the cursor 1912/1922/1932. Hence, a user may be able to perform a key input through the backside input unit 232 without touching the display unit.

The backside input unit 230 may include a single button, three buttons including a center-arranged key 233 and two keys provided to both sides centering on the center-arranged key 233, or five buttons including a center-arranged key 233 and four keys provided in four directions centering on the center-arranged key 233.

In a case in which the backside input unit 230 includes 5 buttons, it should be appreciated that the former embodiments described with reference to FIGS. 8 to 19 are applicable. For instance, referring to FIG. 20, a mapping relation between an input combination of 5 buttons and a function or application indicated by the input combination may be established.

It will be apparent to those skilled in the art that various modifications and variations can be specified into other form(s) without departing from the spirit or scope of the disclosures. In addition, the above-described methods can be implemented in a program recorded medium as processor-readable codes. The processor-readable media include all kinds of recording devices in which data readable by a processor are stored. The processor-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present disclosure in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present disclosure.

Accordingly, the present disclosure can provide the following features and/or effects. As a user input unit is arranged on a terminal backside, a front display can be configured to have a wider screen. Owing to this configuration of the present disclosure, a lateral side of the terminal can have a considerable inclination or a step difference, whereby new designs can be implemented. A user interface of a new type can be implemented. Moreover, according to the present disclosure, a user can discriminate each button using a tactile sense or the like without directly observation through a shape of a user input unit arranged on a backside of the terminal.

As embodied and broadly described herein, a mobile terminal may include a body, a display provided on a front side of the body, an input device provided on a back side of the body, which input device is exposed through a back surface of the body and has a plurality of buttons, a storage device configured to store a mapping between a prescribed pattern of inputs associated with the input device and prescribed commands for a plurality of functions and a controller configured to control the mobile terminal based on an input at the input device. The input may be detected at the input device, a prescribed pattern associated with the input at the input device may be determined, a command for a function associated with the prescribed pattern of the input may be retrieved from the storage device, and the retrieved command for the function associated with the input may be processed.

The prescribed pattern of inputs may include a combination of an input to at least one of the plurality of the buttons or a combination of a gesture input and an input to at least one of the plurality of the buttons. The gesture input may include at least one of shaking the mobile terminal, rotating the mobile terminal a prescribed amount, tapping or knocking a surface of the mobile terminal, or a touch input at the display. The prescribed pattern of inputs may further include a touch input on the display while selecting a button on the input device.

When the prescribed pattern includes the input being received while the mobile terminal is set in a power saving mode, the controller may be configured to execute a command to release the power saving mode of the mobile terminal. Moreover, when the prescribed pattern includes the input being received while the mobile terminal is set in a locked mode, the controller may be configured to execute a command to release the locked mode of the mobile terminal.

An image corresponding to the input device on the back side of the body may be displayed on the display. The image may provide feedback to indicate selection of one or more of the plurality of buttons. The image may be an image of the input device including the plurality of buttons of the input device and may graphically represent selection of one or more of the plurality of buttons. A light emitting device may be provided on the body. The light emitting device may be configured to output feedback corresponding to the inputs at the input device.

The controller may determine a position of the body. When the body is positioned such that the input device is not accessible, a soft key representative of the input device on the rear surface of the body may be displayed on the display. The soft key may be configured to receive inputs corresponding to each of the plurality of buttons on the input device. The mobile terminal may further include a sensing device configured to sense the position of the body. The soft key may be displayed when the mobile terminal is placed face up on a surface such that the rear surface is facing down.

The mobile terminal may further include a microphone configured to receive an audio signal. The audio signal may be used to detect a gesture input tapping the mobile terminal. When the gesture input is detected, the controller may display a soft key representative of the input device. The soft key may be configured to receive inputs corresponding to each of the plurality of buttons on the input device.

The user input device may include a first button provided through the rear surface of the body and a second button provided adjacent the first button. A first portion of the second button may be provided adjacent a first side of the first button and a second portion of the second button may be provided adjacent a second side of the first button opposite the first side. The first and second portions may be configured to receive different inputs.

In another embodiment according to the present disclosure, a mobile terminal may include a body, a touchscreen provided on a front side of the body, an input device provided on a back side of the body, the input device being exposed through a back surface of the body and including a first button and a second button having a plurality of buttons arranged adjacent to and centered around the first button, and a controller configured to control a function based on a selection of the first or second buttons. When at least one of the first button or the second button is selected, the controller may control a different function to be activated depending on whether the touchscreen is being touched.

When a push input is applied to the first button while the touchscreen is not being touched, the controller may be configured to turn off power or adjust an operational state of the touchscreen in response to the push input. When the push input is applied to the first button while the touchscreen is being touched, the controller may be configured to process a command related to a target selected by the input on the touchscreen. When the selected target includes a text, the controller may be configured to initiate a web search for the selected text.

When the second button part is pushed while the touchscreen is not being touched, the controller may be configured to control a first function to be activated in response to the push input. When the second button part is pushed while the touchscreen is being touched, the controller may be configured to control a second function different from the first function to be activated in response to the push input. The first function and the second function may include at least one of a volume adjustment, a screen enlargement/reduction, or a screen scroll.

In another embodiment according to the present disclosure, a method of controlling a mobile terminal may include receiving an input at an input device provided on a back side of a body of the mobile terminal, the input device being exposed through a back surface of the body and having a plurality of buttons, determining a prescribed pattern associated with the received input, the prescribed pattern including at least one of a prescribed pattern of input to the plurality of buttons, an input on a touchscreen together with an input to the input device, a gesture input, or a state of the touchscreen or the mobile terminal at the time of an input at the input device, retrieving a command for a function associated with the prescribed pattern from a storage device, the storage device storing a mapping between a plurality of patterns of inputs and prescribed commands for a plurality of functions, and processing the retrieved command associated with the received input.

In another aspect of the present disclosure, a mobile terminal according to one embodiment of the present disclosure may include a display unit configured to have at least one portion exposed on a front side of the mobile terminal, a backside input unit configured to be exposed on a backside of the mobile terminal by having a plurality of buttons, a memory configured to store a mapping relation between a combination example of a plurality of the buttons and an application activate command, and a controller, if receiving a user input according to a prescribed combination of a plurality of the buttons, extracting the application activate command mapped to the inputted combination from the memory, the controller processing the extracted application activate command.

In another aspect of the present disclosure, a mobile terminal according to another embodiment of the present disclosure includes a display unit configured to have at least one portion exposed on a front side of the mobile terminal, a backside input unit configured to be exposed on a backside of the mobile terminal by including a first button part and a second button part having a plurality of buttons arranged on both sides centering on the first button part, and a controller, when either the first button part or the second button part is pushed, controlling a different function to be activated depending on whether the display unit is being touched.

In a further aspect of the present disclosure, a method of controlling a mobile terminal according to a further embodiment of the present disclosure includes the steps of receiving a user input according to a prescribed combination of a plurality of buttons exposed on a backside of the mobile terminal, extracting an application activate command mapped to the inputted combination from a memory, and processing the extracted application activate command.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a body;
   a touchscreen provided on a front side of the body;
   an input device provided on a back side of the body, the input device being exposed through a back surface of the body and having a plurality of buttons which includes a first button;
   a storage device configured to store a mapping between a prescribed pattern of inputs associated with the input device and prescribed commands for a plurality of functions; and
   a controller configured to control the mobile terminal based on an input at the input device,
   wherein the input is detected at the input device, a prescribed pattern associated with the input at the input device is determined, a command for a function associated with the prescribed pattern of the input is retrieved from the storage device, and the retrieved command for the function associated with the input is processed,
   wherein the controller is further configured to:
      turn off power or adjust an operational state of the touchscreen in response to a push input when the push input is applied to the first button while the touchscreen is not being touched, and
      process a command related to a target selected by the input on the touchscreen when the push input is applied to the first button while the touchscreen is being touched.

2. The mobile terminal of claim 1, wherein the prescribed pattern of inputs includes a combination of an input to at least one of the plurality of buttons or a combination of a gesture input and an input to at least one of the plurality of the buttons.

3. The mobile terminal of claim 2, wherein the gesture input includes at least one of shaking the mobile terminal, rotating the mobile terminal a prescribed amount, tapping or knocking a surface of the mobile terminal, or a touch input at the touchscreen.

4. The mobile terminal of claim 1, wherein the prescribed pattern of inputs includes a touch input on the touchscreen while selecting a button on the input device.

5. The mobile terminal of claim 1, wherein when the prescribed pattern includes the input being received while the mobile terminal is set in a power saving mode, the controller is configured to execute a command to release the power saving mode of the mobile terminal.

6. The mobile terminal of claim 1, wherein when the prescribed pattern includes the input being received while the mobile terminal is set in a locked mode, the controller is configured to execute a command to release the locked mode of the mobile terminal.

7. The mobile terminal of claim 1, wherein an image corresponding to the input device on the back side of the body is displayed on the touchscreen, the image providing feedback to indicate selection of one or more of the plurality of buttons.

8. The mobile terminal of claim 7, wherein the image is an image of the input device including the plurality of buttons of the input device and graphically represents selection of one or more of the plurality of buttons.

9. The mobile terminal of claim 8, wherein a light emitting device is provided on the body, the light emitting device being configured to output feedback corresponding to the inputs at the input device.

10. The mobile terminal of claim 1, wherein the controller determines a position of the body, and when the body is positioned such that the input device is not accessible, a soft key representative of the input device on the rear surface of the body is displayed on the touchscreen, the soft key being configured to receive inputs corresponding to each of the plurality of buttons on the input device.

11. The mobile terminal of claim 10, further comprising a sensing device configured to sense the position of the body, wherein the soft key is displayed when the mobile terminal is placed face up on a surface such that the rear surface is facing down.

12. The mobile terminal of claim 1, further comprising a microphone configured to receive an audio signal, wherein the audio signal is used to detect a gesture input tapping the mobile terminal, and when the gesture input is detected, the controller displays a soft key representative of the input device, the soft key being configured to receive inputs corresponding to each of the plurality of buttons on the input device.

13. The mobile terminal of claim 1, the user input device further includes:
    a second button provided adjacent the first button, a first portion of the second button provided adjacent a first side of the first button and a second portion of the second button provided adjacent a second side of the first button opposite the first side, the first and second portions being configured to receive different inputs.

14. The mobile terminal of claim 1, wherein when the selected target includes a text, the controller is configured to initiate a web search for the selected text.

15. The mobile terminal of claim 1, wherein when the second button part is pushed while the touchscreen is not being touched, the controller is configured to control a first function to be activated in response to the push input, and when the second button part is pushed while the touchscreen is being touched, the controller is configured to control a second function different from the first function to be activated in response to the push input.

16. The mobile terminal of claim 15, wherein the first function and the second function include at least one of a volume adjustment, a screen enlargement/reduction, or a screen scroll.

17. A method of controlling a mobile terminal, comprising:
    receiving an input at an input device provided on a back side of a body of the mobile terminal, the input device being exposed through a back surface of the body and having a plurality of buttons which includes a first button;
    determining a prescribed pattern associated with the received input, the prescribed pattern including at least one of a prescribed pattern of input to the plurality of buttons, an input on a touchscreen together with an input to the input device, a gesture input, or a state of the touchscreen or the mobile terminal at the time of an input at the input device;
    retrieving a command for a function associated with the prescribed pattern from a storage device, the storage device storing a mapping between a plurality of patterns of inputs and prescribed commands for a plurality of functions; and
    processing the retrieved command associated with the received input,
    wherein the processing further comprising turning off power or adjusting an operational state of the touchscreen in response to a push input when the push input is applied to the first button while the touch screen is not being touched, and processing a command related to a target selected by the input on the touchscreen when the push input is applied to the first button while the touchscreen is being touched.

* * * * *